United States Patent
Masenten

(10) Patent No.: US 6,704,349 B1
(45) Date of Patent: Mar. 9, 2004

(54) METHOD AND APPARATUS FOR CANCELING A TRANSMIT SIGNAL SPECTRUM IN A RECEIVER BANDWIDTH

(75) Inventor: Wesley K. Masenten, Irvine, CA (US)

(73) Assignee: Ditrans Corporation, Newport Beach, CA (US)

( * ) Notice: Subject to any disclaimer, the term of this patent is extended or adjusted under 35 U.S.C. 154(b) by 0 days.

(21) Appl. No.: 09/487,396

(22) Filed: Jan. 18, 2000

(51) Int. Cl.[7] .............................. H04B 1/38; H04L 5/16
(52) U.S. Cl. .................................. 375/219; 375/346
(58) Field of Search ............................. 375/219, 232, 375/216, 316, 346; 370/342, 201, 278; 455/570; 381/93

(56) References Cited

U.S. PATENT DOCUMENTS

| 4,475,243 A | 10/1984 | Batlivala et al. |
| 4,535,476 A | 8/1985 | Carlin |
| 5,675,613 A | * 10/1997 | Uwano et al. ............... 375/346 |
| 5,691,978 A | * 11/1997 | Kenworthy .................. 370/278 |
| 6,169,912 B1 | * 1/2001 | Zuckerman ................. 455/570 |

FOREIGN PATENT DOCUMENTS

WO PCT/US01/01896 1/2001

* cited by examiner

Primary Examiner—Stephen Chin
Assistant Examiner—Curtis Odom
(74) Attorney, Agent, or Firm—Knobbe, Martens, Olson & Bear, LLP

(57) ABSTRACT

A method and apparatus for attenuating a transmit signal spectrum in a receiver bandwidth. The apparatus relates to an adaptive, digital, coherent, spectral canceller. The method comprises digitizing both a corrupted receiver signal and a reference transmit signal and then digitally implementing an adaptive coherent spectral canceller module to suppress a residue transmit spectral signal power within the receiver bandwidth.

5 Claims, 23 Drawing Sheets

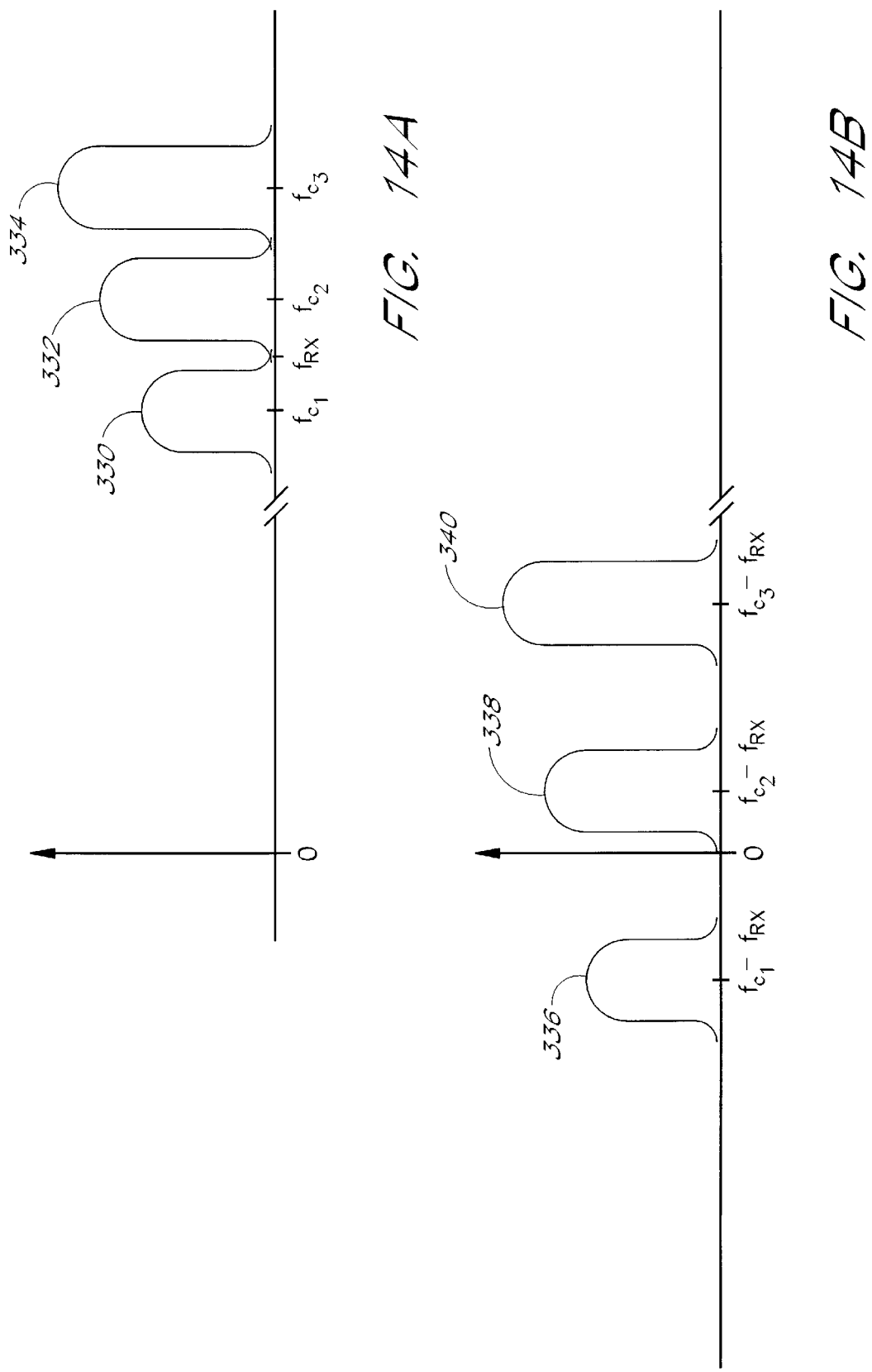

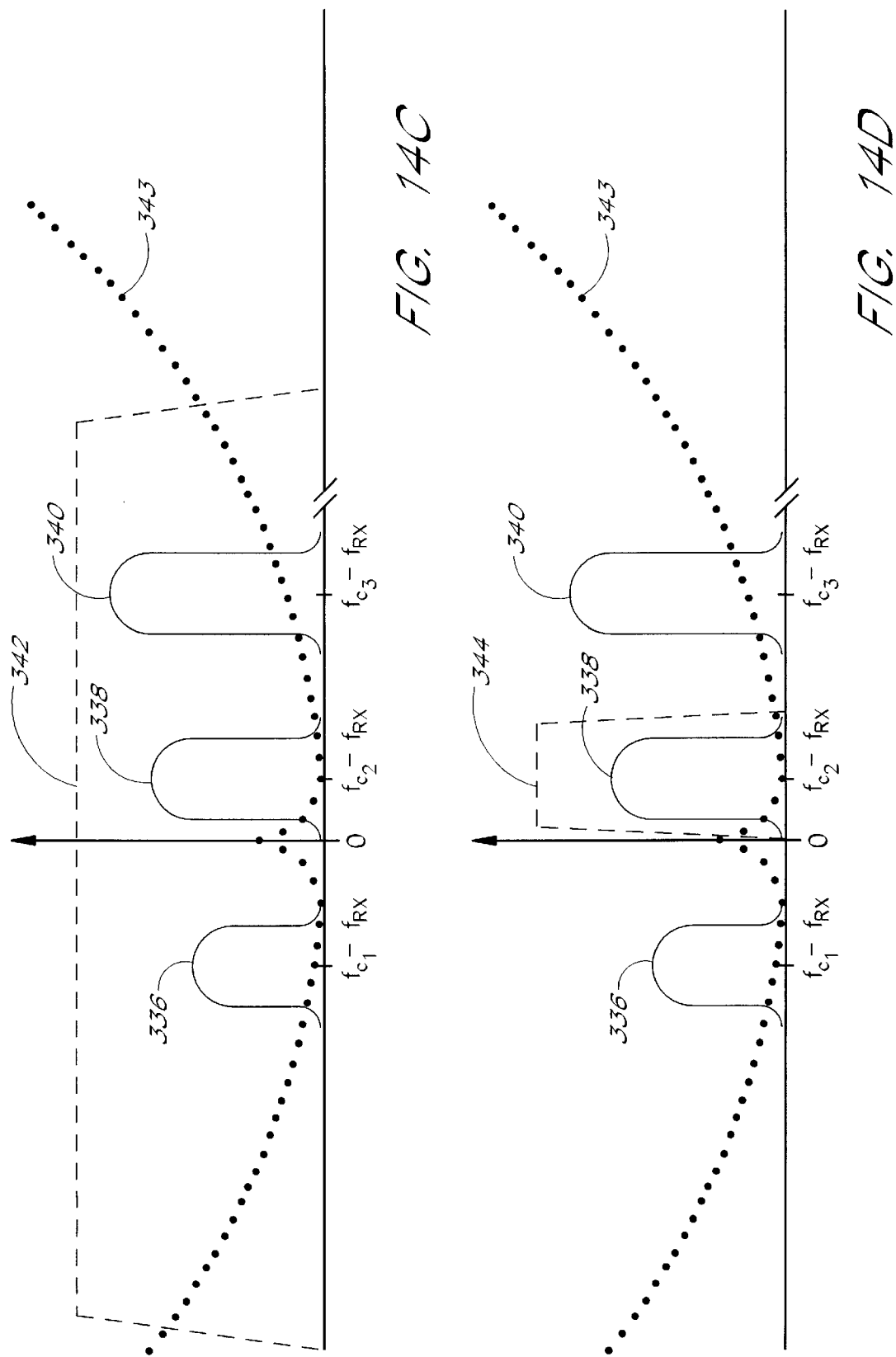

METHOD AND APPARATUS FOR CANCELING A TRANSMIT SIGNAL SPECTRUM IN A RECEIVER BANDWIDTH

BACKGROUND OF THE INVENTION

1. Field of the Invention

The present invention relates to wireless communications. More specifically, the invention relates to canceling transmitter signal energy in a receiver bandwidth.

2. Description of the Related Art

There is a growing need for low cost, high performance radio transceivers that can operate in a full duplex mode in support of such applications as code division multiple access (CDMA), global system for mobile communications (GSM) and time division multiple access (TDMA) remote units and base stations.

Currently, a standard transceiver comprises a transmitter, a receiver and a duplexer. One problem with standard transceivers is some of the transmit signal leaks into the receiver, which corrupts the received signal processed by the receiver.

SUMMARY OF THE INVENTION

In some transceivers, the duplexer functions to reduce the transmit signal received by the receiver through the use of one or more circulators, receive filters and/or transmit filters. For example, a circulator within the duplexer directs the transmit signal toward an antenna radiator, while a receive filter rejects the residual transmit energy directed toward the receiver that falls outside of the receive filter bandwidth. Alternatively, some duplexers do not use a circulator.

Imperfect duplexers create two problems. First, the high-level transmit signal from the transmitter drives the receiver into a non-linear operating region. This problem can be solved by increasing the rejection characteristics of the receive filter to more effectively attenuate the main spectral lobe of the transmitter signal. Alternatively, this problem may be mitigated through the use of a high dynamic range, direct conversion, digital receiver that can implement the requisite filter characteristics with lossless digital filtering.

A second problem is noise from the transmitter leaks into the receiver and raises its noise figure. The second problem can be mitigated by further filtering the transmitter output and by reducing the spectral sidelobe energy through signal design and linearization of a transmit amplifier. These changes, however, are undesirable from the standpoint of transmitter efficiency.

Canceling an undesired signal with an adaptive canceller was introduced by B. Widrow et al. in *Adaptive Noise Canceling Principles and Applications*, Proc. IEEE, Vol. 63, pp. 1269–1716, December 1975, which is hereby incorporated herein by reference. Specific applications for adaptive noise canceling and echo cancellation in data transmission over telephone channels are given by J.G. Proakis et al. in *Advanced Digital Signal Processing*, Macmillan Publishing Co., New York, 1992, pp. 322–327, 331–332.

The present invention relates to a method and apparatus for adaptive digital cancellation of a transmit signal spectrum in a receiver bandwidth. The apparatus relates to a digital coherent spectral canceller that attenuates the spectral components from the transmitter that fall within the bandwidth of the receiver. The digital adaptive coherent spectral canceller digitizes both a corrupted receiver signal and a reference transmit signal and then digitally implements an adaptive coherent spectral canceller adaptation module.

One embodiment of the invention is implemented with a direct conversion digital receiver, which achieves an image-free, high dynamic range without the use of automatic gain control. Automatic gain control used to extend the dynamic range of a receiver may be undesirable for spectrally crowded applications such as cellular communications because the automatic gain control may make the receiver sensitivity dependent upon signals and interference that are outside the signal channel. For example, it is possible for a strong signal in an adjacent channel to capture the receiver front end and desensitize the receiver such that a weak signal in the channel of interest is undetectable. This is particularly harmful in a base station receiver where the receiver receives incoming signals from multiple remote units. Furthermore, the use of automatic gain control will likely require the digital coherent canceller to track the gain changes which will introduce errors and noise.

One embodiment of the invention uses an adaptive transversal filter in an all digital implementation to compensate for the amplitude and phase differences between the transmitter-to-receiver leakage path and the transmit signal path utilized as a reference over the receiver bandwidth or bandwidth of interest.

An advantage of the invention is reduced complexity and cost, which is achieved through: (1) reduced performance requirements of the duplexer, (2) reduction in the requirement for transmit signal filtering, and (3) reduction in the requirements for high linearity or linearization of the transmit amplifier.

One aspect of the invention relates to an adaptive, coherent, digital canceller system. The canceller system is configured to attenuate a signal spectrum from a transmitter which falls within a bandwidth of a receiver. The canceller system comprises a reference bandpass filter, a reference direct converter, a cross correlation measurer, an adaptation coherent spectral canceller algorithm module executed, for example, on a microcontroller, an adaptive digital transversal filter, and a combiner.

The reference direct converter is adapted to output a digitized transmit signal reference of a spectral energy of the transmitter within the bandwidth of the receiver. The adaptive digital transversal filter is adapted to align an amplitude and phase of a digitized transmit signal reference in a reference path with a transmit signal in a leakage receiver path. The adaptive digital transversal filter outputs a compensated or equalized digitized transmit signal reference. The combiner is adapted to coherently subtract the compensated, digitized transmit signal reference from a corrupted, digitized receiver signal to form a residue, having transmitter spectral signal power within the bandwidth of a receiver is suppressed.

Another aspect of the invention relates to a method of attenuating a transmit signal spectrum in a bandwidth of a receiver. The method comprises digitizing a received signal which is corrupted by components of a transmit signal, creating a digitized reference transmit signal of the transmit signal within the bandwidth of the receiver, aligning the digitized reference transmit signal in amplitude, phase and time delay with the digitized received signal, subtracting the digitized reference transmit signal from the digitized received signal to form a residue, and suppressing a transmitter spectral signal,power of the residue within the bandwidth of the receiver.

BRIEF DESCRIPTION OF THE DRAWINGS

FIGS. 14A–14E are spectral plots used to illustrate the operation of various embodiments of the transceiver of FIG. 1.

DETAILED DESCRIPTION OF THE EMBODIMENTS

Figure 1:
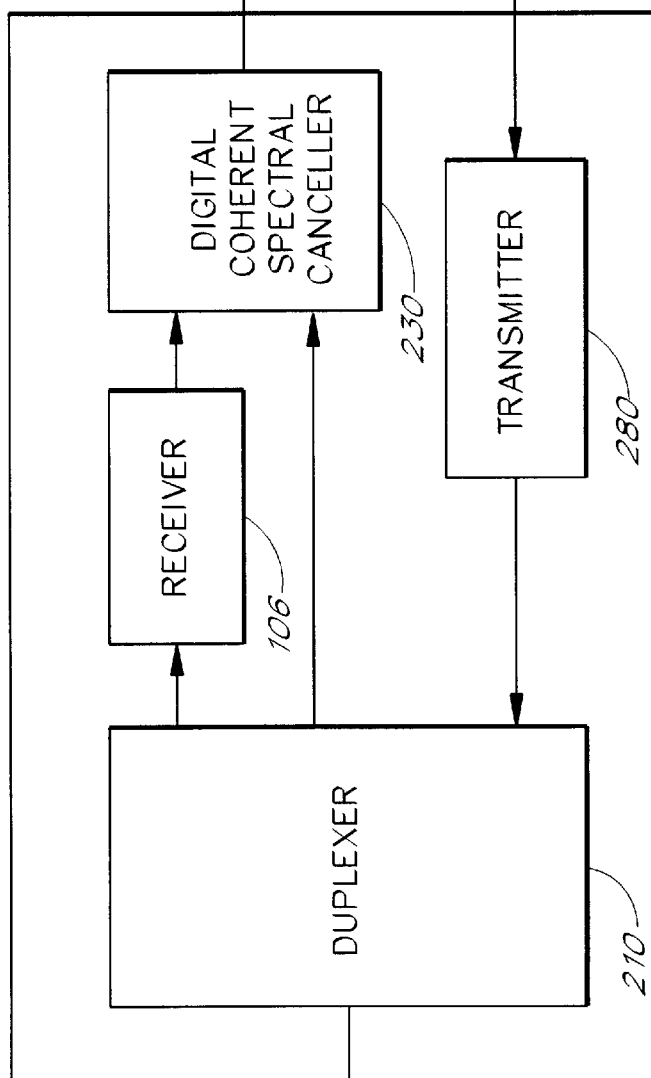
FIG. 1 illustrates one embodiment of a transceiver and a processor in accordance with the present invention.

FIG. 1 illustrates an exemplifying communication system in which the present invention may be implemented. Alternatively, the present invention may be used in other systems and applications. FIG. 1 illustrates one embodiment of a transceiver 200 and a processor 900 in accordance with the present invention. In one embodiment, the transceiver 200 is a full duplex transceiver, although the invention can be used in communication systems in which the base station concurrently transmits and receives regardless of whether the communication system provides full duplex operation.

In one embodiment, the transceiver 200 is for code division multiple access (CDMA) mobile and base station transceivers. In another embodiment, the transceiver 200 is for a time division multiple access (TDMA) transceiver, such as a transceiver used for GSM and IS-54 base stations. In FIG. 1, the transceiver 200 comprises transmit and receive antenna radiator 102, a duplexer 210, a receiver 106, a transmitter 280 and a digital coherent spectral canceller 230. In one embodiment, the receiver 106 is a direct conversion digital receiver described herein. In another embodiment, the receiver 106 is a modified direct conversion digital receiver described in U.S. Pat. No. 5,557,642, entitled "Direct Conversion Receiver For Multiple Protocols" by Williams modified to exclude automatic gain control.

In FIG. 1, the transmitter 280 and the digital coherent spectral canceller 230 are coupled to the processor 900. The transmit and receive antenna radiator 102 is coupled to the duplexer 210, which is coupled to the receiver 106, the digital coherent spectral canceller 230 and the transmitter 280. The processor 900 sends data and control signals to the transmitter 280, which sends data to the duplexer 210 for transmission via the antenna radiator 102. The duplexer 210 sends a reference transmit signal to the canceller 230. The duplexer 210 also receives data from the radiator 102 and sends data to the receiver 106, which sends the received data to the canceller 230. The canceller 230 and the processor 900 use the reference transmit signal from the duplexer 210 to cancel noise from the transmitter 280 that leaked into the receiver bandwidth.

In some conventional systems, noise from the transmitter 280 that leaks into the receiver 106 can be mitigated by further filtering the transmitter output and by reducing the spectral sidelobe energy through signal design and linearization of a transmit amplifier. These changes, however, are undesirable from the standpoint of transmitter efficiency.

The digital adaptive coherent spectral canceller 230 of the present invention attenuates the spectral components from the transmitter 280 that fall within the bandwidth of the receiver 106. The digital canceller 230 digitizes both a corrupted receiver signal and a reference transmit signal and then digitally implements an adaptive coherent spectral canceller adaptation module with the processor 900.

The receiver 106 is preferably a direct conversion digital receiver that achieves an image-free, high dynamic range without the use of automatic gain control. Automatic gain control used to extend the dynamic range of a receiver may be undesirable for spectrally crowded applications such as cellular communications because the automatic gain control may make the receiver sensitivity dependent upon signals and interference that are outside the signal channel.

The digital coherent spectral canceller 230 of the present invention and the methods of using the canceller 230 provide several advantages over conventional systems. These advantages include (1) reducing performance requirements of the duplexer 210, (2) reducing the requirement for transmit signal filtering, and (3) reducing in the requirements for high linearity or linearization of the transmit amplifier.

Figure 2A:
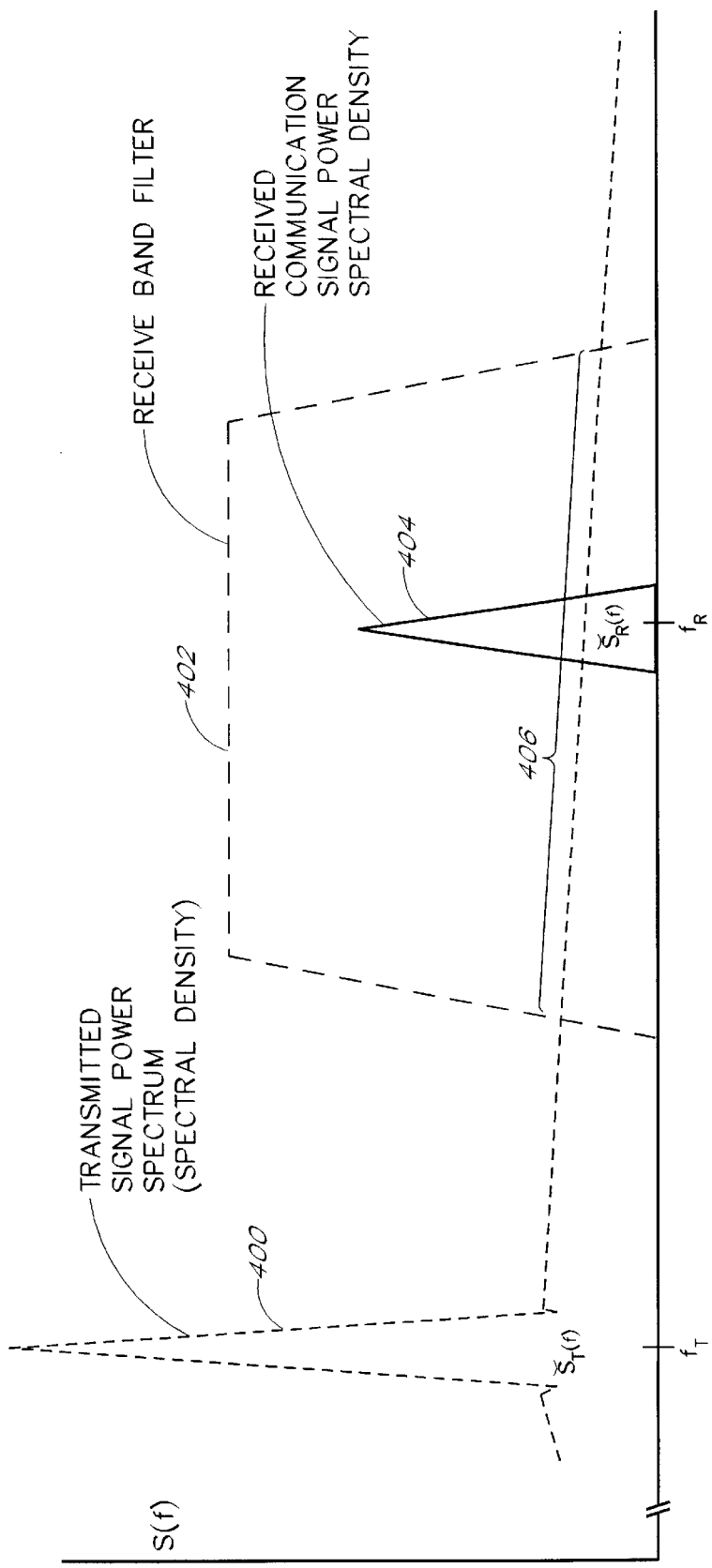
FIG. 2A illustrates transmitter spectral spillage into a receiver bandwidth with a single channel.
Figure 2B:
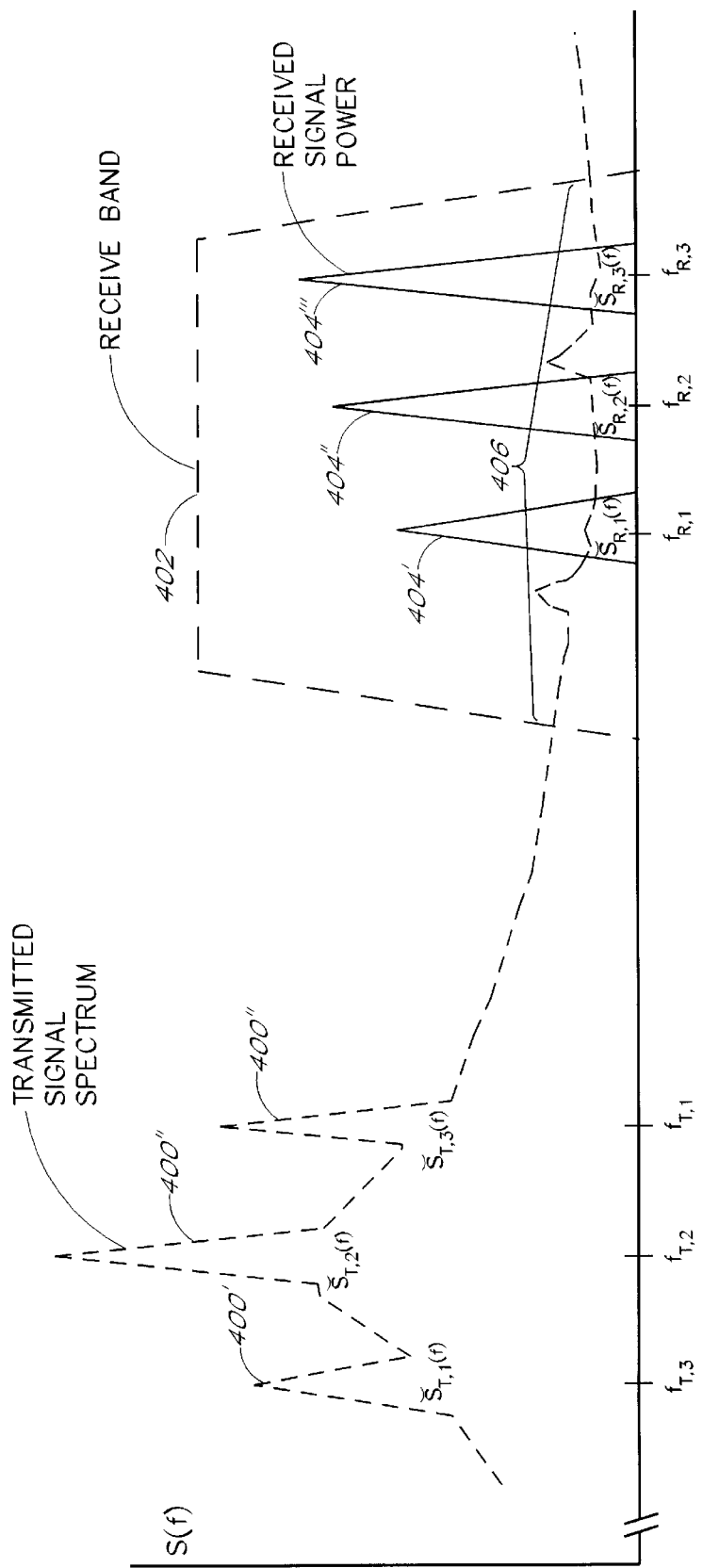
FIG. 2B illustrates transmitter spectral spillage into a receiver bandwidth with multiple channels.
Figure 4:
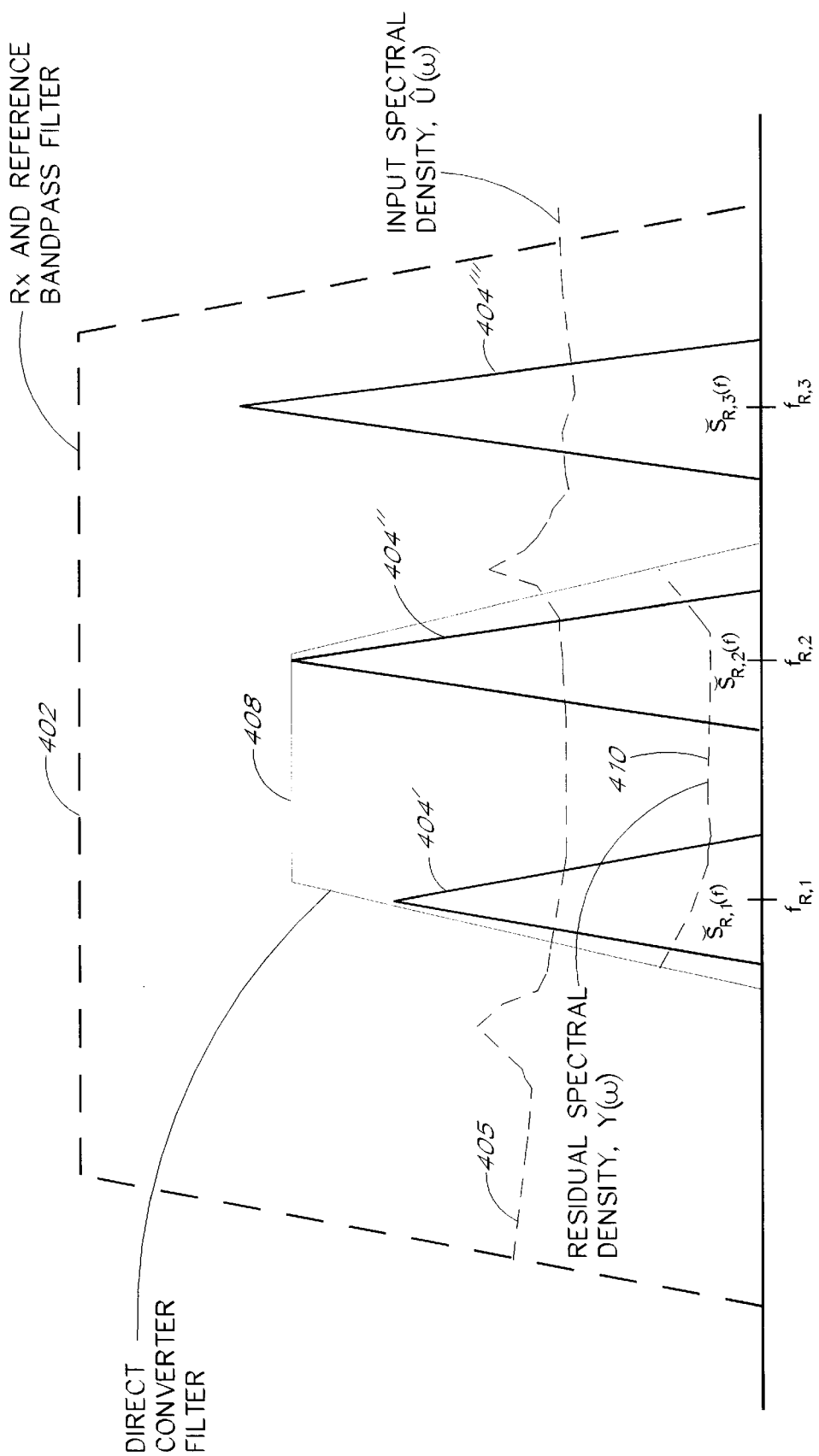
FIG. 4 illustrates an exemplary spectral density at an input and output of an adaptive coherent spectral canceller within the transceiver of FIG. 1.

FIG. 2A illustrates a single-channel system with a transmitted signal power spectrum (spectral density) 400, denoted as $\overline{S}_T(f)$ and centered about a transmit frequency $f_T$, and a received communication signal power 404, denoted as $\overline{S}_R(f)$ and centered about a receive frequency $f_R$. In FIGS. 2A, 2B and 4, the horizontal axis represents frequency (f), such as in units of Gigahertz, and the vertical axis represents signal power amplitude, such as in units of decibels. The horizontal axis has been segmented so that more of the signal energy can be shown.

FIG. 2A also illustrates a receiver bandwidth 402 from a receiver bandpass filter, such as the receiver bandpass filter 214 described below with reference to FIG. 5A. The receiver bandwidth 402 is designed to pass the received signal 404 but not the main transmit signal 400. The transmitted signal power spectrum 400 and the receiver bandwidth 402 are shown in dashed lines. FIG. 2A also shows transmit spectral spillage 406 in the receiver bandwidth 402 from a single channel. In other words, noise 406 from the transmitter 280 (FIG. 1) leaks (spills) into the receiver 106 and raises its noise figure. The canceller 230 of the FIG. 1 is designed to cancel this transmit noise 406 within the receiver bandwidth 402.

FIG. 2B illustrates a multiple-channel system with a plurality of transmitted signal powers 400', 400'', 400''', a receiver bandwidth 402 and a plurality of received communication signal powers 404', 404'', 404'''. FIG. 2B also shows transmitter spectral spillage 406 in the receiver bandwidth 402 from multiple channels (multiple transmit signals and multiple receive signals). In FIGS. 2A and 2B, the plots represent signals which have passed through an amplifier in the receiver 106 of FIG. 1, such as the low noise amplifier 216 shown in FIG. 5A.

FIG. 4 illustrates an exemplary spectral density at an input and output of the adaptive coherent spectral canceller 230, as shown in FIG. 1 and described in greater detail below with reference to FIGS. 5A, 5B and 6. FIG. 4 is based on the plots within the receiver bandwidth 402 of FIG. 2B. In FIG. 4, the bandpass transfer function 402 of the receiver bandpass filter 214 (FIG. 5A) passes the three received signal power densities 404', 404'', 404''' and the transmit noise spectral density 406.

In FIG. 4, a direct converter filter, such as the direct converter 220 described below with reference to FIG. 5A, has an even more selective transfer function 408 than the receiver bandpass filter transfer function 402. The direct converter filter transfer function 408 passes only two 404', 404'' of the three signal spectral densities 404', 404'', 404''' and a portion of the transmit noise spectral density 406. In other words, only two received spectral densities 404', 404'' are efficiently passed through the direct converter 220 and on to the canceller 230 (FIGS. 1 and 5A). As shown in FIG. 4, the canceller 230 reduces the transmit noise spectral density 406 to a residual spectral density 410 or lower.

Figure 3:
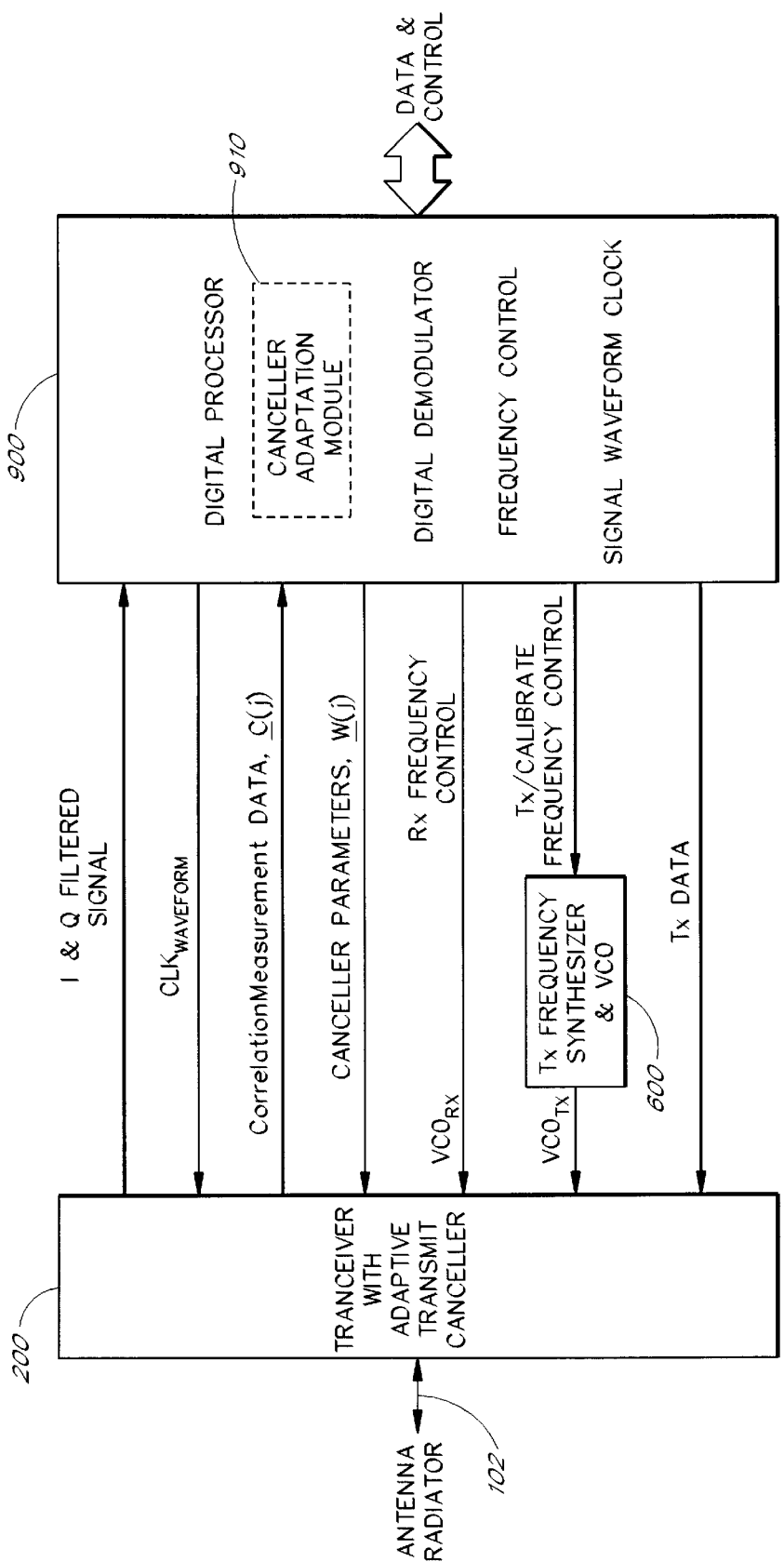
FIG. 3 illustrates one embodiment of a communication system with a transceiver in accordance with the present invention.

FIG. 3 illustrates some of the inputs, outputs, signal flow and functions of the processor 900 and the transceiver 200 of FIG. 1. FIG. 3 illustrates an antenna radiator 102, a transceiver 200, a processor 900 and a transmitter frequency synthesizer and VCO 600. The transceiver 200 comprises an adaptive digital canceller 230, as shown in FIGS. 1, 5A, 5B and 6, in accordance with the present invention.

In FIG. 3, the processor 900 comprises a canceller adaptation algorithm module 910, a digital demodulator module, a frequency control module and a signal waveform clock module. The modules may comprise software, firmware, hardware or any combination thereof or may be implemented with discrete logic or in an application specific integrated circuit (ASIC). In an alternative embodiment, the canceller adaptation module 910 may be executed by a dedicated element, which is separate from the processor 900. In one embodiment, the processor 900 comprises a collection of processing elements such as an ARM or a Power Point microprocessor and a dedicated digital modem such as the Qualcomm MSM 3000. Alternatively, in other embodiments, the configuration of the processor 900 may be different.

In FIG. 3, the antenna radiator 102 is coupled to the transceiver 200, which is coupled to the processor 900. The processor 900 is coupled to the transmitter frequency synthesizer and VCO 600, which is coupled to the transceiver 200. The processor 900 may be coupled to other components that transfer data and/or control signals to the processor 900 or receive signals from the processor 900.

As shown in FIG. 3, the transceiver 200 transmits and receives signals via the antenna radiator 102. The transceiver 200 passes various data to the processor 900, such as an I & Q filtered signal and correlation measurement data, $\underline{C}(j)$, as described below with reference to FIG. 5. In this application, the underlining of a variable, such as $\underline{C}(j)$, denotes that the variable is a complex variable, i.e., the variable consists of an in-phase (I) component and a quadrature component (Q).

The processor 900 may pass various data to the transceiver 200, such as a clock waveform, CLK, canceller parameters, $\underline{W}(j)$, and transmitter data. The processor 900 may also provide control information, such as a receiver frequency control signal, to the transceiver 200. The processor 900 may also provide control information, such as a transmitter or calibration frequency control signal, to the transmitter frequency synthesizer and VCO 600, which transmits a signal to the transceiver 200.

Figure 5A:
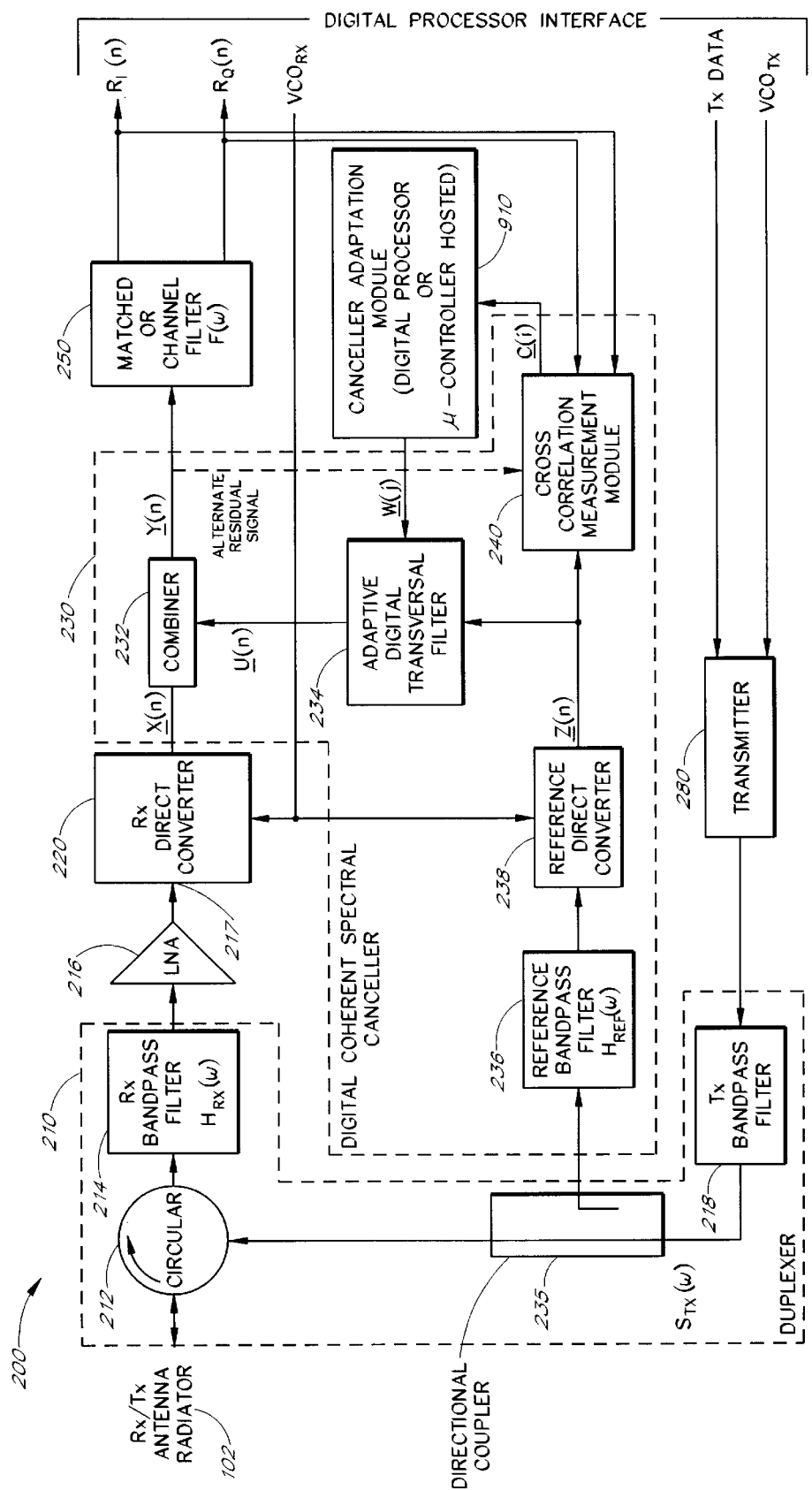
FIG. 5A illustrates one embodiment of a transceiver with a shared transmit and receive antenna radiator.

FIG. 5A illustrates one embodiment of the transceiver 200 of FIG. 3 with a shared receiver/transmitter (Rx/Tx) antenna radiator 102 and an adaptive, digital, coherent spectral canceller 230. In FIG. 5A, the transceiver 200 comprises a duplexer 210, a low noise amplifier (LNA) 216, a receiver direct converter 220, a digital adaptive coherent spectral canceller 230, a matched or channel filter 250 and a transmitter 280. The duplexer 210 comprises a circulator 212, a receiver bandpass filter 214, a transmitter bandpass filter 218 and a directional coupler 235. The canceller 230 comprises a combiner 232, an adaptive digital transversal filter (or equalizer) 234, a reference bandpass filter 236, a reference direct converter 238 and a cross correlation measurement module 240.

In another embodiment, the duplexer 210 does not comprise a directional coupler 235, and instead some of the energy passed to the antenna radiator 102 is coupled to an input of the reference bandpass filter 236 within the canceller 230.

In FIG. 5A, the transmitter 280 receives data and control signals from a digital processor interface. The transmitter 280 is coupled to the transmitter bandpass filter 218, which is coupled to the directional coupler 235. The directional coupler 235 is coupled to the circulator 212 and the reference bandpass filter 236. The circulator 212 is coupled to the antenna radiator 102 and the receiver bandpass filter 214, which is coupled to the LNA 216. The LNA 216 is coupled to the receiver direct converter 220, which is coupled to the combiner 232, the reference direct converter 238 and the digital processor interface. The combiner 232 is coupled to the matched or channel filter 250 and the adaptive digital transversal filter 234. In one embodiment, the combiner 232 is also coupled to the cross correlation measurement module 240. The matched filter 250 is coupled to the digital processor interface and the cross correlation measurement module 240. The reference bandpass filter 236 is coupled to the reference direct converter 238, which is coupled to the receiver direct converter 220, the digital processor interface, the adaptive digital transversal filter 234 and the cross correlation measurement module 240. Both the adaptive digital transversal filter 234 and the cross correlation measurement module 240 are coupled to the canceller adaptation module 910, which is executed by the digital processor 900 (FIG. 3) or by a separate microcontroller.

The general use and operation of the transceiver 200 is described with reference to FIGS. 1–5A. In FIG. 5A, the antenna radiator 102 receives an incoming signal and transfers the incoming signal to the circulator 212. In one embodiment, the incoming signal is a high frequency signal, such as a digitally modulated RF signal centered about a carrier frequency of approximately 2 Gigahertz (GHz). Alternatively, in other embodiments, other signals and carrier frequencies may be used in accordance with the invention. The circulator 212 transfers the received signal to the receiver bandpass filter 214.

Concurrently, the transmitter 280 may be transmitting a signal to the transmitter bandpass filter 218, which outputs a transmitter signal, $S_{TX}(t)$, to the circulator 212. The signals described herein may be represented as either functions of time, (t), or alternatively, as their Fourier equivalents, functions of frequency, ($\omega$). The circulator 212 directs the transmit signal to the antenna radiator 102. As shown in FIGS. 2A, 2B and 4, some of the energy associated with the transmit signal, $S_{TX}(t)$, leaks into the receiver bandpass filter 214 because the circulator 212 does not provide perfect isolation. This leakage signal energy 406 is limited by the receiver bandpass filter 214, as shown in FIGS. 2A, 2B and 4.

The resultant output of the receiver bandpass filter 214 due to $S_{TX}(t)$ and the received signal is input to the LNA 216. The LNA 216 amplifies the signal and passes the signal to the receiver direct converter 220. The receiver direct converter 220 converts the filtered signal 217 to a baseband, digitized and filtered signal to produce an output, X(n).

In FIG. 5A, the digital coherent spectral canceller 230 adaptively suppresses the transmitter spectral spillage 406 in the receiver band 402 shown in FIG. 4. Specifically, the directional coupler 235 provides a reference signal to the digital coherent spectral canceller 230. The reference signal represents the transmit signal, $S_{TX}(t)$. Within the canceller 230, the reference signal is passed to the reference bandpass filter 236. The transfer function, $H_{REF}(\omega)$, of the reference bandpass filter 236 preferably matches the transfer function, $H_{RX}(\omega)$ of the receiver bandpass filter 214 in the previously described leakage path to the receiver direct converter 220. Alternatively, one of the filters 214, 236 may be designed to cancel a smaller bandwidth (more rejection) compared to the other filter 214, 236. The reference bandpass filter 236 outputs a signal to the reference direct converter 238, where the reference signal is converted to a digitized, baseband signal.

The reference direct converter 238 creates a digitized reference of the spectral energy of the transmitter 280 within the bandwidth 402 of the receiver (FIG. 4) to produce an output, Z(n). The reference direct converter 238 transfers the signal Z(n) to the adaptive digital transversal filter 234 and the cross correlation measurement module 240.

The adaptive digital transversal filter 234 compensates for the amplitude and phase differences between the transmitter-to-receiver leakage path (the receiver filter 214 and direct converter 220) and the reference transmit signal path (the reference filter 236 and direct converter 238) used as a reference over the receiver bandwidth or bandwidth of interest. In a preferred embodiment, the adaptive digital transversal filter 234 aligns and shapes the digitized transmit signal reference, Z(n), from the reference path in amplitude and phase to substantially match the amplitude and phase of the transmit leakage signal through the leakage receiver path. The adaptive digital transversal filter 234 outputs an output signal, U(n), to the combiner 232.

In FIG. 5A, the combiner 232 uses two summers 424, 426 to coherently subtract the output, U(n), of the adaptive digital transversal filter 234 from the digitized receiver output, X(n), to form a signal, Y(n), whose transmitter spectral spillage signal power (the error) within the receiver bandwidth is suppressed, as shown in FIG. 4. The signal Y(n) is passed to the matched or channel filter 250, which outputs a signal R(n). The signals Y(n) and/or R(n) may be referred to as the 'residue.'

The matched or channel filter 250 passes the residue signal R(n) to the cross-correlation measurement module 240. The cross-correlation measurement module 240 identifies the common signal characteristics of the receiver path and the reference path by cross-correlating the signal inputs. In one embodiment, the cross correlation module 240 identifies the common signal characteristics between R(n) and Z(n). The cross correlation measurement module 240 outputs parameters C(j) to the canceller adaptation module 910.

The canceller adaptation module 910 executes an adaptive cancellation algorithm which is described below and outputs adaptive filter coefficients W(j) to the adaptive digital transversal filter 234. The canceller adaptation module 910 adjusts the adaptive filter coefficients, W(j) such that the cross-correlation between the digitized transmit reference signal, Z(n), and the residue, R(n), are minimized in a least mean-square sense over a bandwidth of interest.

Alternatively, in another embodiment, Y(n) may be used instead of R(n) as the residue, which is input into the cross correlation module 240. The cancellation bandwidth can be expanded to the bandwidth of the receiver bandpass filter 214 and reference bandpass filter 236, $F(\omega)=1$, by utilizing the output of the combiner 232, Y(n), for the residual signal instead of R(n).

The digital adaptive coherent spectral canceller 230 is preferably implemented with two high dynamic range direct converters 220, 238. The direct converters 220, 238 provide high dynamic range, substantially identical performance and no automatic gain control. Digitization allows use of high performance, easily repeatable digital filters, such as the adaptive digital transversal filter 234. In general, digital filters are more repeatable than analog filters. The digital filters are advantageously used in the present invention for more effective cancellation.

In FIG. 5A, the receiver direct converter 220 preferably converts the coupled signal 217 using the same local oscillator signal, $VCO_{RX}$, as the reference direct converter 238, because the canceller 230 focuses on the portion of the filtered transmit signal spectrum that is within the receiver bandwidth, as illustrated in FIGS. 2A, 2B and 4.

Figure 5B:
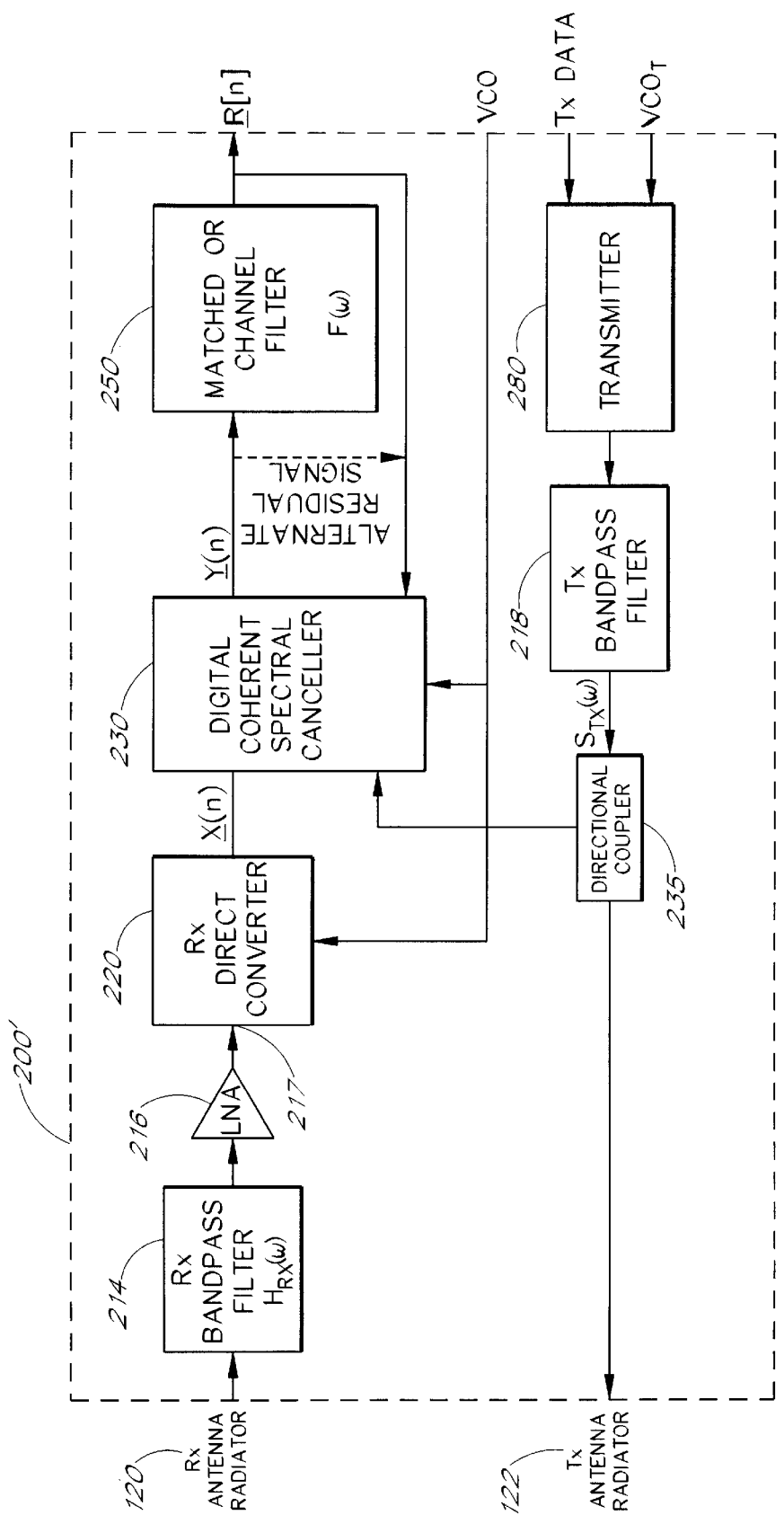
FIG. 5B illustrates one embodiment of a transceiver with separate receive and transmit antenna radiators.

FIG. 5B illustrates an alternate embodiment of a transceiver 200' of FIG. 3 with separate receive and transmit antenna radiators 120, 122 and an adaptive transmit canceller 230. In FIG. 5B, the transceiver 200' comprises a receiver bandpass filter 214, a low noise amplifier (LNA) 216, a receiver direct converter 220, a digital adaptive coherent spectral canceller 230, a matched or channel filter 250, a directional coupler 235, a transmitter bandpass filter 218 and a transmitter 280.

In FIG. 5B, the transmitter 280 receives data and control signals from the digital processor interface. The transmitter 280 is coupled to the transmitter bandpass filter 218, which is coupled to the directional coupler 235. The directional coupler 235 is coupled to the transmitter antenna radiator 122 and the spectral canceller 230. The receiver antenna radiator 120 is coupled to the receiver bandpass filter 214, which is coupled to the LNA 216. The LNA 216 is coupled to the receiver direct converter 220, which is coupled to the digital processor interface and the spectral canceller 230. The spectral canceller 230 is coupled to the digital processor interface and the matched or channel filter 250, which is also coupled to the digital processor interface.

Even though there is no circulator 212 in the transceiver 200' of FIG. 5B as in the transceiver 200 of FIG. 5A, the transceiver 200' of FIG. 5B may still experience transmit spectral spillage or leakage into the receive path as the receiving antenna radiator 120 receives the signal energy radiated by the transmitting antenna radiator 122.

In addition to canceling or attenuating leakage from the subject transmitter frequency, the transceiver 200' of FIG. 5B can also be configured to cancel interference from other transmit antennas located in the proximity of the receiver.

Figure 6:
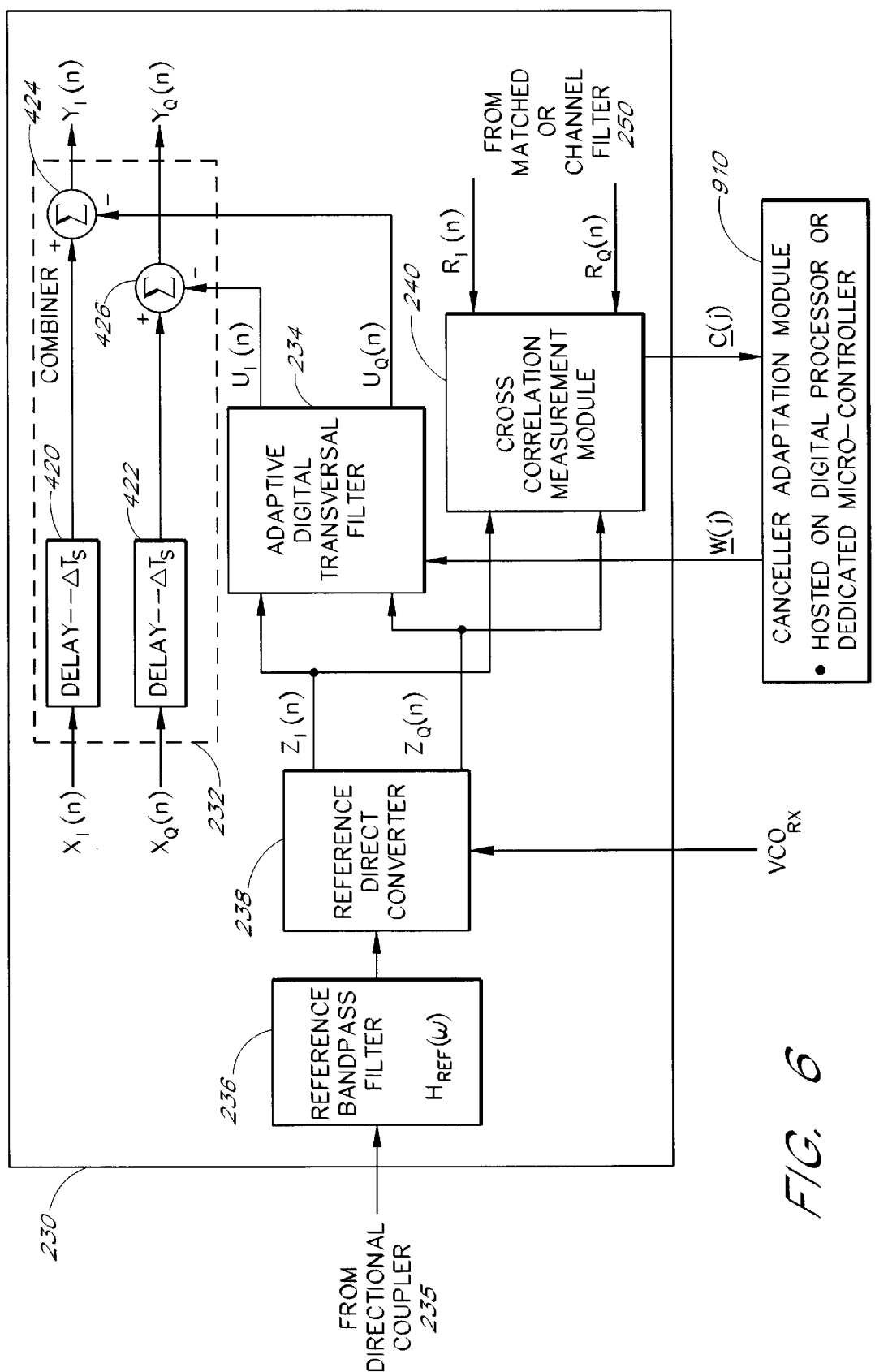
FIG. 6 illustrates one embodiment of a digital coherent spectral canceller within the transceiver of FIGS. 5A and 5B.

FIG. 6 illustrates one embodiment of a digital coherent spectral canceller 230 within the transceivers 200, 200' of FIGS. 5A and 5B. As explained above, the canceller 230 comprises a combiner 232, an adaptive digital transversal filter 234, a reference bandpass filter 236, a reference direct converter 238 and a cross correlation measurement module 240.

In FIG. 6, the reference bandpass filter 236 receives a signal from the directional coupler 235 (FIG. 5A) and outputs a signal to the reference direct converter 238. The reference direct converter 238 is coupled to the adaptive digital transversal filter 234, the cross correlation measurement module 240 and the digital processor interface (FIG. 5A). The adaptive digital transversal filter 234 is coupled to the canceller adaptation module 910 and the combiner 232, which is coupled to the matched or channel filter 250 (FIG. 5A) and the receiver direct converter 220 (FIG. 5A). As shown in FIG. 5A, the combiner 232 may also be coupled to the cross correlation measurement module 240. The cross correlation measurement module 240 is coupled to the matched filter 250 (FIG. 5A) and the canceller adaptation module 910.

In FIG. 6, the reference direct converter 238 creates a digitized reference of the spectral energy of the transmitter 280 within the bandwidth of the receiver to produce an output, Z(n). The output of the reference direct converter 238, Z(n), comprises an in-phase component, $Z_I(n)$, and a quadrature component, $Z_Q(n)$, as shown in FIG. 6. The reference direct converter 238 outputs both the I and Q components of the signal Z(n) to the adaptive digital transversal filter 234 and to the cross correlation measurement module 240. The cross correlation measurement module 240 also receives an I and a Q component of a residue signal R(n) from the matched or channel filter 250. The adaptive digital transversal filter 234 outputs an in-phase component, $U_I(n)$, and a quadrature component, $U_Q(n)$ (an I and a Q component) of an output signal, U(n), to the combiner 232.

In FIG. 6, the combiner 232 preferably uses a digital delay $\Delta T_S$ 420, 422 to compensate for differences in time delays between the reference path and the leakage receiver path. The digital delay reduces time de-correlation effects and instabilities due to different path lengths and processing times between the receiver and reference paths.

In FIG. 6, the in-phase and quadrature component outputs of the combiner 232 are given as:

$$Y_I(n) = X_I(n-\Delta) - U_I(n) \quad (1)$$

$$Y_Q(n) = X_Q(n-\Delta) - U_Q(n) \quad (2)$$

where the terms are defined as follows:

$X_I(n)$ Digitized output of I-path of direct converter 220, $X_Q(n)$ Digitized output of Q-path of direct converter 220, $Y_I(n)$ I-path output of combiner 232, $Y_Q(n)$ Q-path output of combiner 232, $U_I(n)$ I-path output of adaptive digital transversal filter 234, $U_Q(n)$ Q-path output of adaptive digital transversal filter 234, $\Delta$ Integer number of sample periods, $T_S$, for delay added to approximately compensate for the difference in delay between the reference and signal paths.

The outputs of adaptive digital transversal filter 234 are:

$$U_I(n) = \sum_{k=0}^{K} \{W_{k-I}(j)Z_I(n-k) - W_{k-Q}(j)Z_Q(n-k_s)\} \quad (3)$$

$$U_Q(n) = \sum_{k=0}^{K} \{W_{k-I}(j)Z_Q(n-k) + W_{k-Q}(j)Z_I(n-k)\} \quad (4)$$

where the terms are defined as follows:

$Z_I(n)$ Digitized output of I-path of the reference direct converter 238, $Z_Q(n)$ Digitized output of Q-path of the reference direct converter 238, $W_{K-I}(j)$ I coefficients of the adaptive digital transversal filter 234 at the j-th iteration of an adaptation algorithm of the canceller adaptation module 910, $W_{K-Q}(j)$ Q coefficients of the adaptive digital transversal filter 234 at the j-th iteration of an adaptation algorithm of the canceller adaptation module 910, K Number of taps (complex coefficients) in the adaptive digital transversal filter 234.

The adaptation module 910 adjusts the coefficient vector, W(j), of the adaptive digital transversal filter 234 to minimize the transmitter energy within the bandwidth determined by either the bandwidth of the direct converters 220 and 238 or the bandpass filters 214 and 236. Specifically, this may be expressed as minimizing the error $$\varepsilon(\omega) = \int_{\omega 1}^{\omega 2} |[X(\omega)e^{-j\omega\Delta Ts} - Z(\omega)A(\omega)]|^2 |F(\omega)|^2 d\omega \quad (5)$$

where the terms are defined as follows:

$X(\omega)$ The digitized and filtered output of the receiver direct converter 220, $Z(\omega)$ The digitized and filtered output of the reference direct converter 238, $A(\omega)$ The transfer function of the adaptive digital transversal filter 234, $F(\omega)$ The transfer function of the matched or channel filter 250, where $F(\omega)=1$ in the alternative embodiment.

$\omega_2$ Upper frequency (in radians) over which transmitter spectrum is to be cancelled.

$\omega_1$ Lower frequency (in radians) over which transmitter spectrum is to be cancelled.

$T_s$ Sampling period of output of receiver direct converter 220 and reference direct converter 238 (reciprocal of sampling frequency).

Where the coefficients, $\{[W_{k-I}(j), W_{k-Q}(j),], k=1 \ldots K\}$, are selected to minimize $\varepsilon(\omega)$.

The coefficients associated with the adaptation algorithm used by the adaptive digital transversal filter 234 which minimize $\epsilon(\omega)$ are:

$$W_{k-I}(j+1)=\rho \cdot W_{k-I}(j)+\upsilon \cdot C_{k-I}(j) \qquad (6)$$

$$W_{k-Q}(j+1)=\rho \cdot W_{k-Q}(j)+\upsilon \cdot C_{k-Q}(j) \qquad (7)$$

where, $$C_{k-I}(j) = \sum_{m=n}^{M+n} \{Z_I[m-k] \cdot R_I[m] - Z_Q[m-k] \cdot R_Q[m]\}, \qquad (8)$$

$$C_{k-Q}(j) = \sum_{m=n}^{M+n} \{Z_Q[m-k] \cdot R_I[m] + Z_I[m-k] \cdot R_Q[m]\}, \qquad (9)$$

for k=1 . . . K, with M representing the number of samples in the measurement interval, $\rho$ representing a constant set so that the integrated correlated noise component does not grow with the iterations, and $\upsilon$ the step size at each iteration.

Together, FIGS. 9A, 9B, 10A and 10B are used to illustrate examples of the cancellation obtainable as a function of the complex coefficients (taps) of the adaptive digital transversal filter 234, where the bandwidth of $F(\omega)$ is one quarter of the sampling frequency. In FIGS. 9A–10B, the horizontal axis represents frequency×1000/sample rate. The vertical axis represents amplitude in decibels (dB).

Figure 9A:
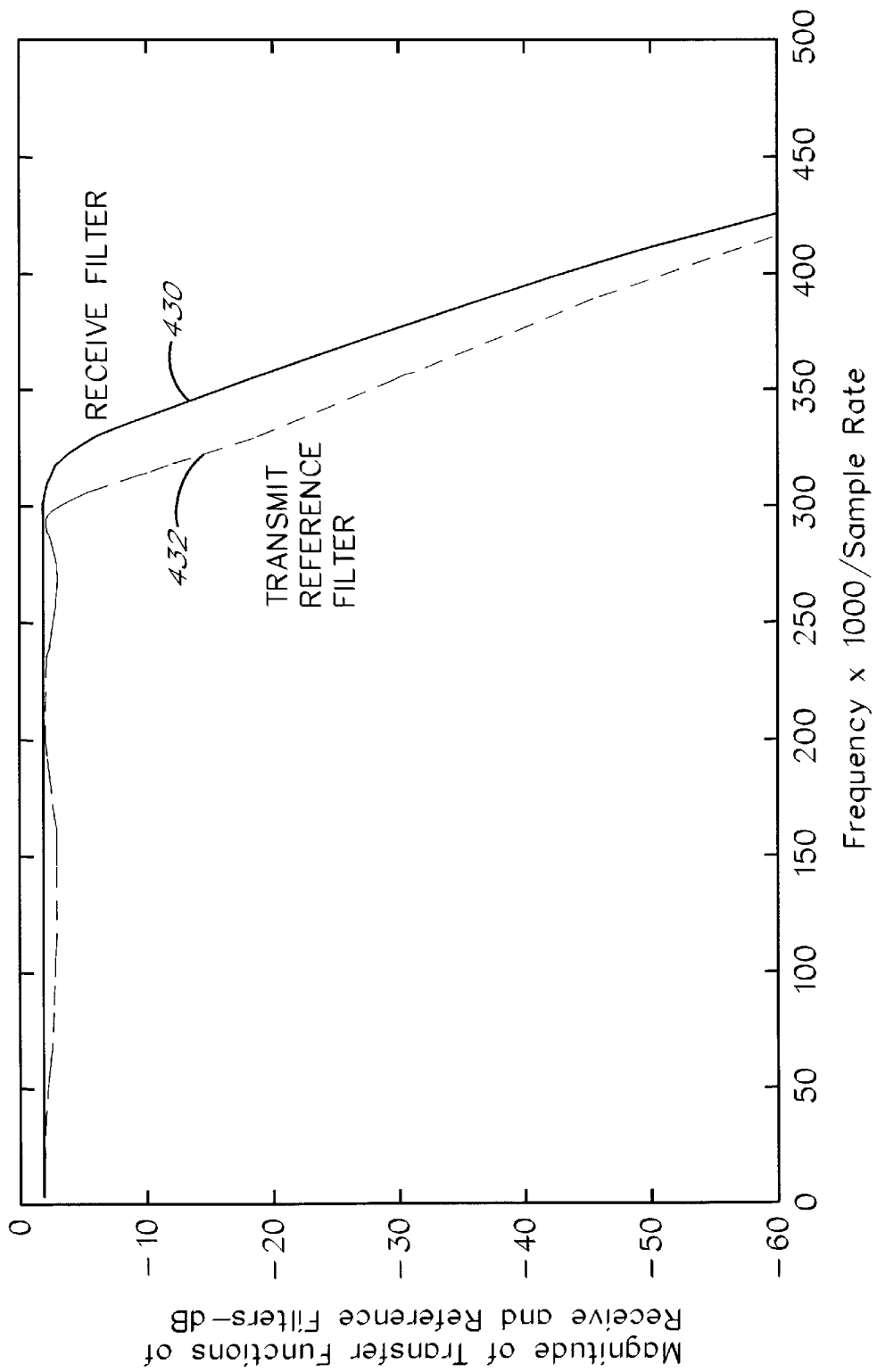
FIG. 9A illustrates exemplary baseband responses of one embodiment of a receive filter and a transmit reference filter within the transceiver of FIG. 5A.

FIG. 9A illustrates exemplary effective baseband responses (transfer functions) 430, 432 of one embodiment of the receive filter 214 and the transmit reference filter 236 of FIG. 5A, where the receiver and reference filters 214, 236, $H_{RX}(\omega)$ and $H_{REF}(\omega)$, are Chebyshev bandpass filters designed for equal stop and pass bandwidths with different pass band ripples, such as 0.01 dB and 1.0 dB respectively. In alternative embodiments, the baseband responses 430, 432 shown in FIG. 9A may be switched. In other words, either baseband response 430, 432 shown in FIG. 9A may be associated with the receive filter 214 and/or the transmit reference filter 236.

Figure 9B:
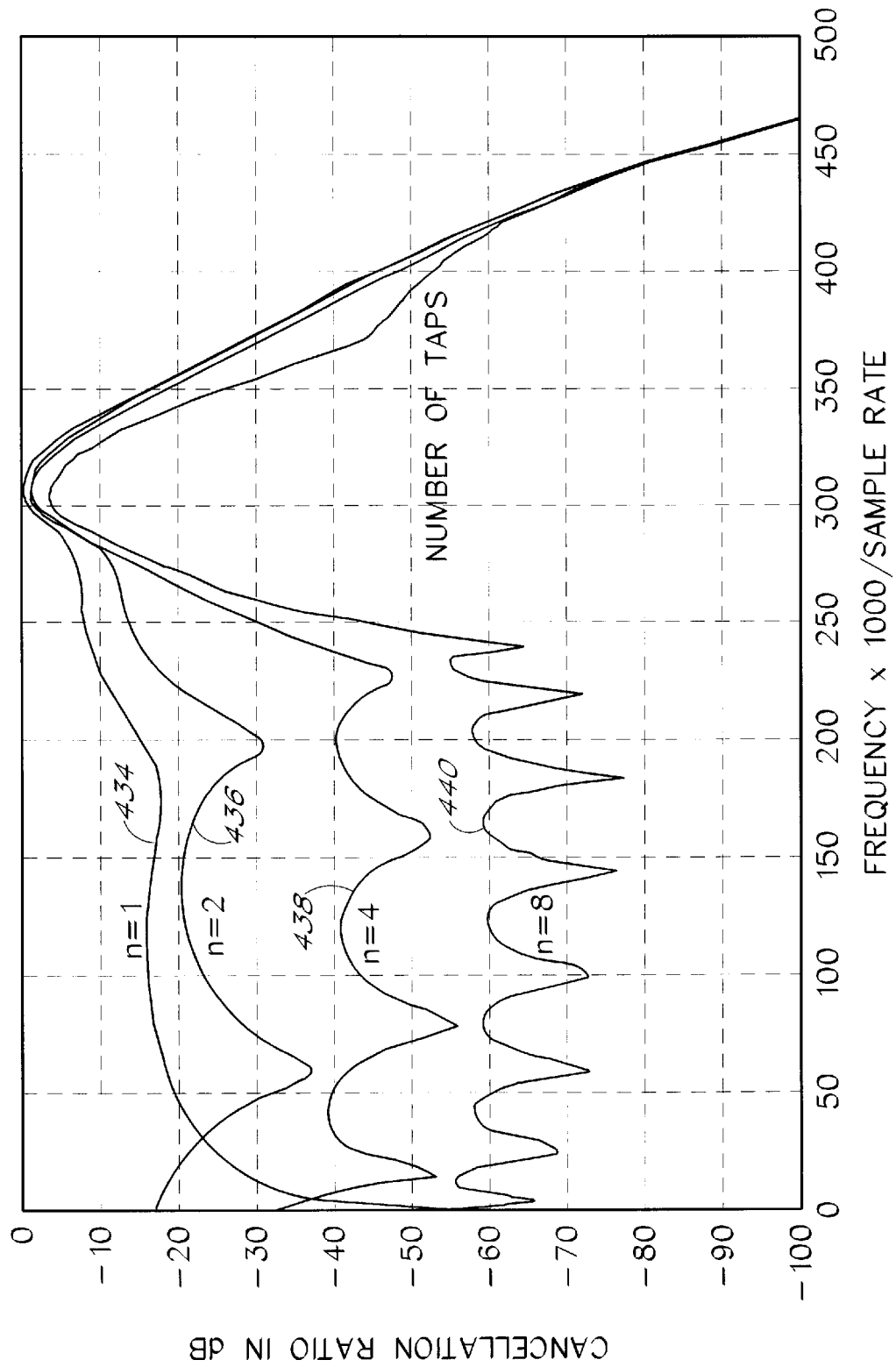
FIG. 9B illustrates cancellation ratios of spectral leakage from the transmitter as a result of a digital coherent spectral canceller of FIG. 5A having varying number of taps with the filter responses of FIG. 9A.

FIG. 9B illustrates $10 \log_{10} |Y(\omega)|^2/|X(\omega)|^2$, cancellation ratios in dB of the spectral leakage from the transmitter 280 due to the digital coherent spectral 230 of FIG. 6. Curves 434–440 represent a different number of taps for the digital coherent spectral 230 of FIG. 6, where the receiver and reference filters 214, 236, $H_{RX}(\omega)$ and $H_{REF}(\omega)$, are Chebyshev bandpass filters with baseband responses illustrated in FIG. 9A. In FIG. 9B, the performance of the digital coherent spectral canceller 230 reflects cancellation over the bandwidth of $\omega_1=0$ to $\omega_2=250$. In FIG. 9B, the line 434 represents the amount of cancellation achieved with an adaptive digital transversal filter 234 of one tap, which does not compensate (equalize) for the frequency dependent mismatch characteristics between the two paths. As shown in FIG. 9B, if the adaptive digital transversal filter 234 uses an increased number of taps, the cancellation performance is significantly improved.

The filtering of the reference transmitter output signal with a reference filter 236 having substantially the same design as the receiver filter 214 (FIG. 9A)(i.e., the transfer functions $H_{RX}(\omega)$ and $H_{REF}(\omega)$ in FIG. 5A are substantially similar) presents at least two advantages. First, it may reduce dynamic range requirements by providing high attenuation to signals outside the receiver band so that the reference direct converter 238 (FIG. 5A) only digitizes the signal within the spectral sidelobes of the transmit signal that fall within the receiver bandwidth. This attenuation may significantly reduce the resolution and linearity requirements of the reference direct converter 238 because the sidelobes within the receiver filter's bandwidth will normally be suppressed more than 40 dB below the peak of the transmitter signal.

Second, using a reference bandpass filter 236 with the same design (i.e., transfer function) as the receiver filter 214 associated with the duplexer 210 may also increase the amount of suppression because the filters 214, 236 provide the same amplitude and phase variations on both signals before the signals are inputted to the direct converters 220, 238, respectively. The adaptive transversal equalizer 234 may advantageously compensate for any small differences in the transfer functions using a smaller number of taps than required if $H_{RX}(\omega)$ and $H_{REF}(\omega)$ in FIG. 5A were not substantially similar.

Figure 10A:
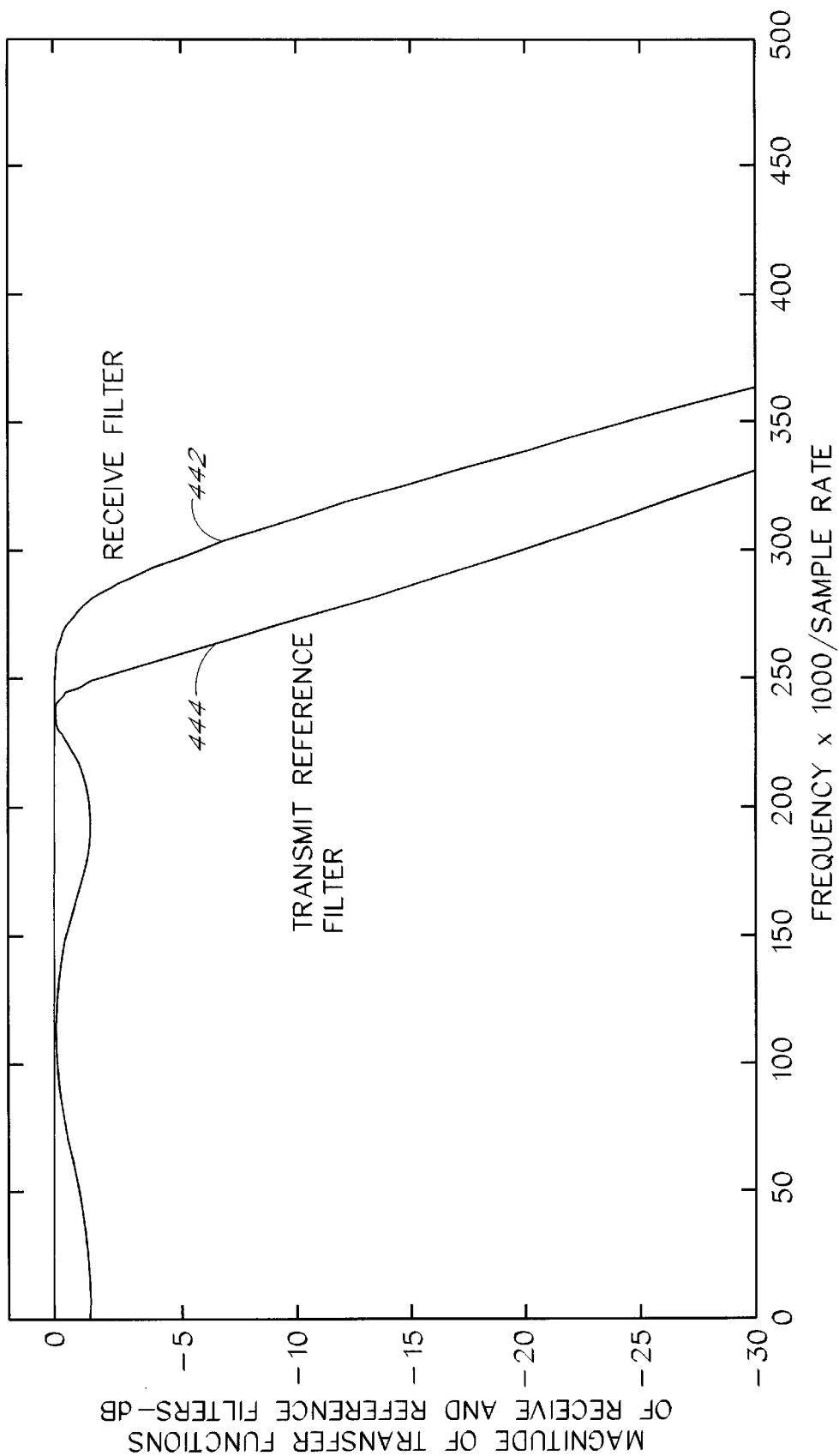
FIG. 10A illustrates exemplary baseband responses of another embodiment of the receive filter and transmit reference filter within the transceiver of FIG. 5A.

FIG. 10A illustrates exemplary cancellation ratio responses 442, 444 of another embodiment of the receiver filter 214 and the transmit reference filter 236 of FIG. 5A, where the receiver and reference filters, $H_{RX}(\omega)$ and $H_{REF}(\omega)$, are Chebyshev bandpass filters designed for different bandwidths and with different pass band ripples, such as 0.5 dB and 1.5 dB respectively. The transfer functions 442, 440, $H_{RX}(\omega)$ and $H_{REF}(\omega)$ of FIG. 10A are less similar than the transfer functions 430, 432 of FIG. 9A. In alternative embodiments, the baseband responses 442, 444 shown in FIG. 10A may be switched. In other words, either baseband response 442, 444 shown in FIG. 10A may be associated with the receive filter 214 and/or the transmit reference filter 236.

Figure 10B:
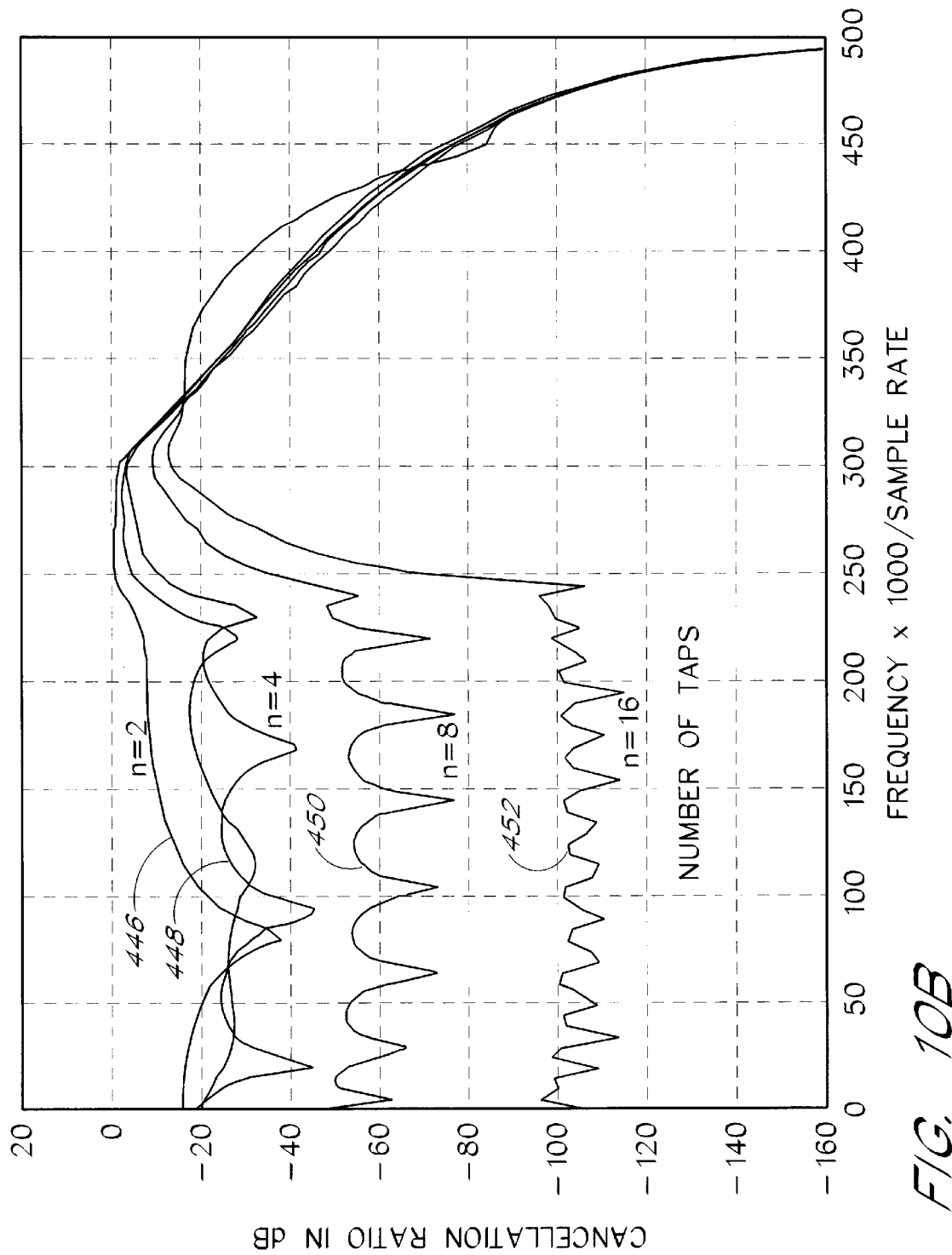
FIG. 10B illustrates exemplary outputs of one embodiment of a digital spectral cancellers of FIG. 5A having varying numbers of taps with the filter responses of FIG. 10A.

FIG. 10B illustrates $10 \log_{10} |Y(\omega)|^2/|X(\omega)|^2$, cancellation ratios in dB of the spectral leakage from the transmitter 280 due to the digital coherent spectral 230 of FIG. 6. Curves 446–452 represent a different number of taps for the digital spectral canceller 230 of FIG. 6, where the receiver and reference filters 214, 236, $H_{RX}(\omega)$ and $H_{REF}(\omega)$, are Chebyshev bandpass filters with baseband responses illustrated in FIG. 10A. In this example, because the transfer functions 442, 440, $H_{RX}(\omega)$ and $H_{REF}(\omega)$, of FIG. 10A are less similar than the transfer functions 430, 432 of FIG. 9A, more complexity (taps) may be needed for the adaptive digital transversal filter 234 to achieve substantially the same level of cancellation performance as the performance shown in FIG. 9B.

Figure 7:
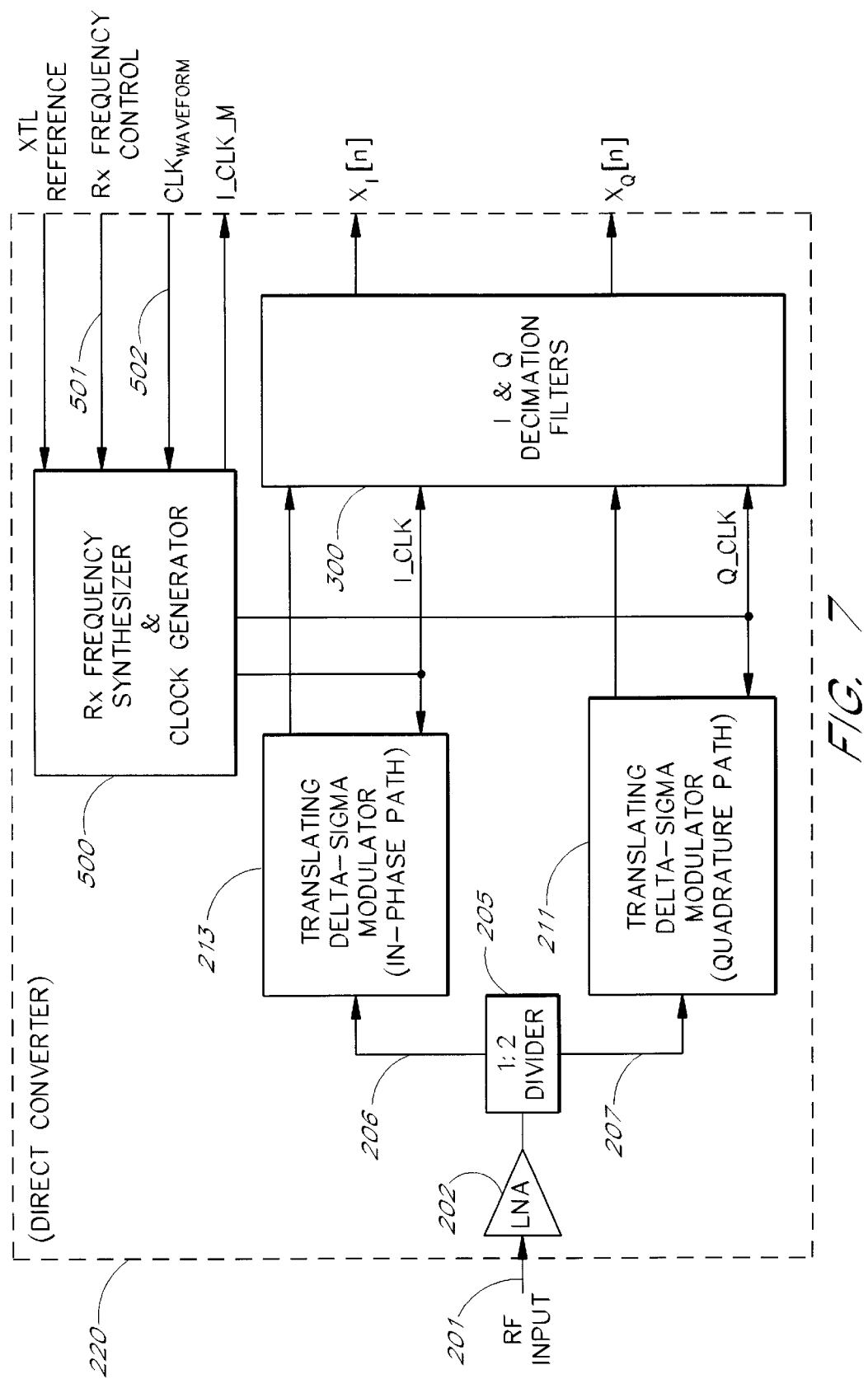
FIG. 7 illustrates one embodiment of a direct converter within the transceiver of FIGS. 5A and 5B.

FIG. 7 illustrates one embodiment of a direct converter 220 within the transceiver 200, 200' of FIGS. 5A or 5B. The structure of the reference direct converter 238 is substantially similar to the structure of the receiver direct converter 220. In FIG. 7, the direct converter 220 comprises an LNA 202, a divider 205, a translating delta-sigma modulator 213 for the in-phase path, a translating delta-sigma modulator 211 for the quadrature path, a receiver frequency synthesizer and clock generator 500, and I & Q decimation filters 300. In one embodiment, the LNA 202 and the LNA 216 of FIG. 5A are two separate components. In another embodiment, the LNA 202 and the LNA 216 represent a single LNA component. The divider 205 may be implemented with a variety of active elements and/or passive elements. The divider 205 may be implemented as a splitter. Alternatively, the output of the LNA 202 can be coupled directly to both of the translating delta-sigma modulators 211, 213.

The LNA 202 of the direct converter 220 and/or the LNA 216 receives an RF signal 201 from the receiver bandpass filter 214 (FIG. 5A). The LNA 202 is coupled to the divider 205, which is coupled to both translating delta-sigma modulators 213, 211. The translating delta-sigma modulators 213, 211 are coupled to the I & Q decimation filters 300 and the receiver synthesizer and clock generator 500. The receiver synthesizer and clock generator 500 is coupled to the reference direct converter 238 (FIG. 5A) and the digital processor interface (FIG. 5A). The decimation filters 300 are coupled to the combiner 232 (FIG. 5A).

In FIG. 7, the LNA 202 amplifies the incoming signal 201 while avoiding the addition of excessive noise and distortion. The divider 205 separates the amplified signal into in-phase and the quadrature components and outputs the in-phase and quadrature components to the in-phase and quadrature modulators 213, 211, respectively. The modulators 213, 211 translate the received I & Q signal components by $f_{RX}$ to the baseband of the received signal and digitize the I & Q signal components. The modulators 213, 211 produce outputs to the decimation filter 300. In one embodiment, the digital data output of each of the modulators 213, 211 is a one-bit data stream at the sample rate equal to $f_{RX}$.

The decimation filter 300 performs digital filtering and decimation to produce digital words at the rate of a clock, CLK. In FIG. 7, the decimation filter 300 converts the stream of 1-bit digital words into a stream of N-bit digital words that comprise conventional binary representations of the signals. In one embodiment, the decimation filter 300 produces a clock signal, CLK_M, which indicates the rate at which the binary representations are created and is used to transfer the filtered output. The rate at which the words produced by the decimation filter 300 is determined by the oversampling ratio. For an oversampling ratio of M, the output clock rate is 1/M times the rate of the incoming data, or alternatively stated, for the embodiment of FIG. 13, the output clock rate is equal to $f_{RX}/M$ where $f_{RX}$ is the rate of the translation and conversion clock, CLK.

The decimator filter 300 also attenuates unwanted signals and noise sources outside of the bandwidth of interest while preserving the signals of interest. The desired filter characteristics of the decimation filter 300 are selected on the basis of the characteristics of the receive signal as well as the conversion clock rate, $f_{RX}$. In one embodiment, the decimation filter 300 has a programmable characteristic which can be modified to accommodate a variety of different waveforms. The decimation filter 300 is preferably implemented with a finite impulse response (FIR) filter whose characteristics are modified by changing the value of the filter coefficients. The value of the filter coefficients of a digital filter can be readily changed via software making such modifications practical.

Figure 8:
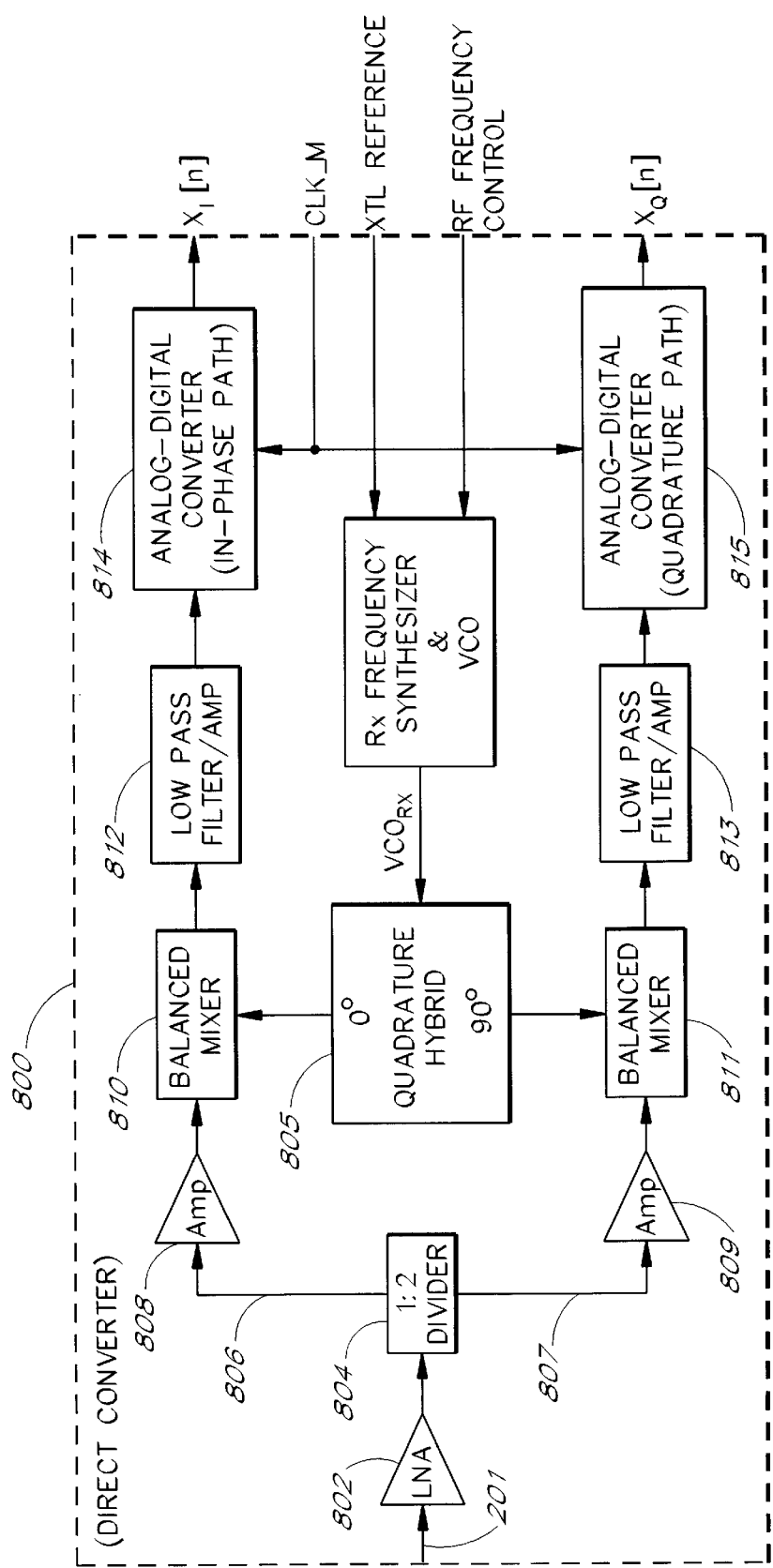
FIG. 8 illustrates another embodiment of a direct converter within the transceiver of FIGS. 5A and 5B.

FIG. 8 illustrates another embodiment of a direct converter 800 within the transceiver 200, 200' of FIGS. 5A or 5B. In FIG. 8, the direct converter 800 comprises an LNA 802, a divider 804, a pair of amps 808, 809, a pair of balanced mixers 810, 811, a pair of low pass filter/amps 812, 813, a pair of analog-digital converters 814, 815, a quadrature hybrid module 805 and a receiver frequency synthesizer and VCO 816. In one embodiment, the LNA 802 and the LNA 216 of FIG. 5A are two separate components. In another embodiment, the LNA 802 and the LNA 216 represent a single LNA component.

The LNA 802 and/or the LNA 216 receives the RF signal 201 from the receiver bandpass filter 214 (FIG. 5A). The LNA 202 is coupled to the divider 804, which is coupled to both amps 808, 809. The amp 808 is coupled to the balanced mixer 810, which is coupled to the quadrature hybrid module 805 and the low pass filter/amp 812. The low pass filter/amp 812 is coupled to the analog-digital converter 814, which is coupled to the analog digital converter 815, the combiner 232 (FIG. 5A) and the digital processor interface (FIG. 5A). The amp 809 is coupled to the balanced mixer 811, which is coupled to the quadrature hybrid module 805 and the low pass filter/amp 813. The low pass filter/amp 813 is coupled to the analog-digital converter 815, which is coupled to the analog digital converter 814, the combiner 232 (FIG. 5A) and the digital processor interface (FIG. 5A).

Figure 11:
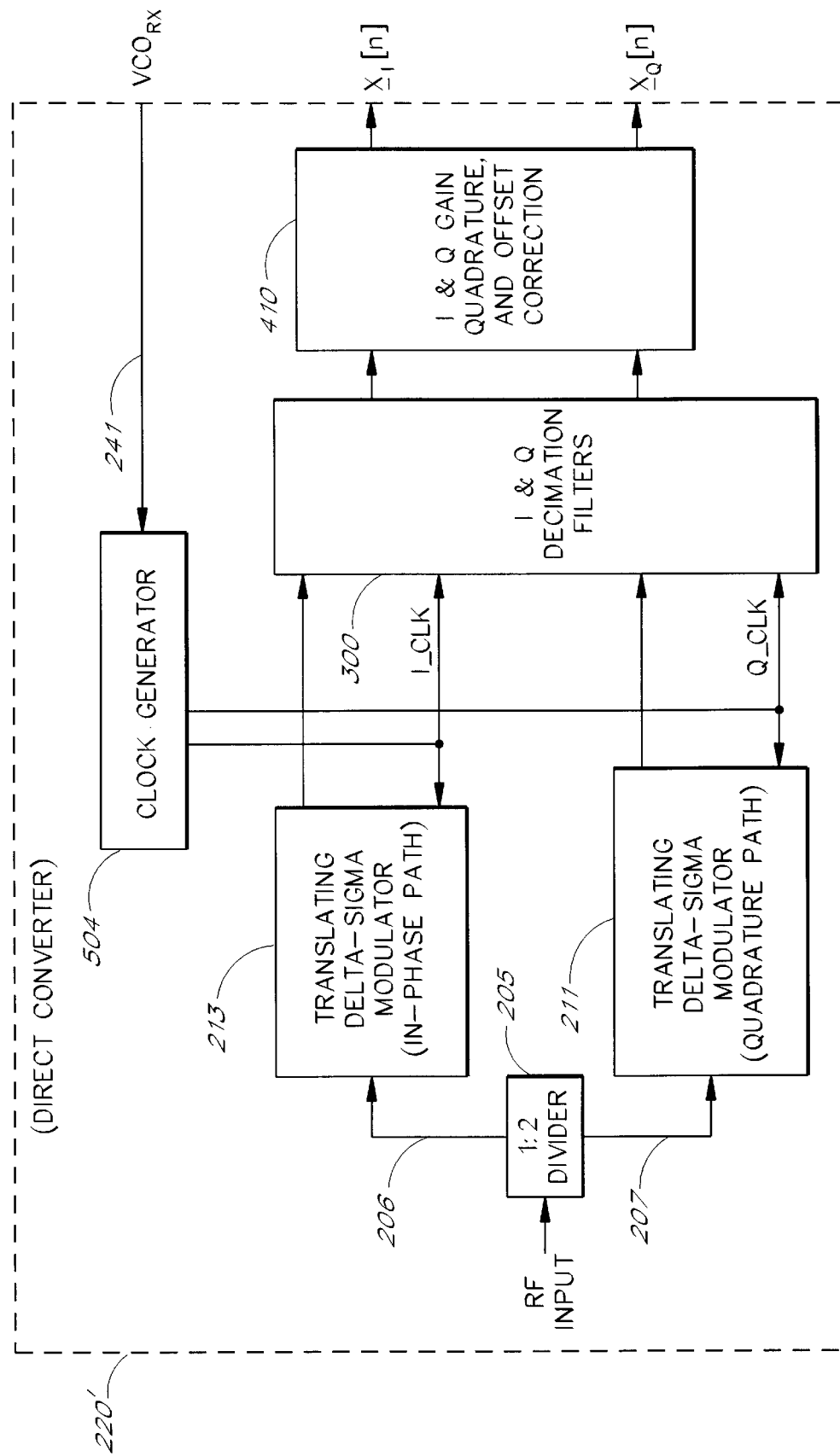
FIG. 11 illustrates another embodiment of a direct converter within the transceiver of FIGS. 5A and 5B.

FIG. 11 illustrates another embodiment of a direct converter 220' within the transceiver 200, 200' of FIGS. 5A or 5B. In FIG. 11, the direct converter 220' comprises a divider 205, a translating delta-sigma modulator 213 for the in-phase path, a translating delta-sigma modulator 211 for the quadrature path, a clock generator 504, an I & Q decimation filters 300 and an I & Q gain quadrature and offset correction module 410. In one embodiment, the direct converter 220' of FIG. 11 may include an input LNA coupled to the RF input of the divider 205.

In FIG. 11, the divider 205 receives an RF input from the LNA 216 (FIG. 5A). The divider 205 is coupled to both translating delta-sigma modulators 213, 211. The translating delta-sigma modulators 213, 211 are coupled to the I & Q decimation filters 300 and the clock generator 504. The clock generator 504 is coupled to the reference direct converter 238 (FIG. 5A) and the digital processor interface (FIG. 5A). The decimation filters 300 are coupled to the I & Q gain quadrature and offset correction module 410, which is coupled to the combiner 232 (FIG. 5A).

Figure 12:
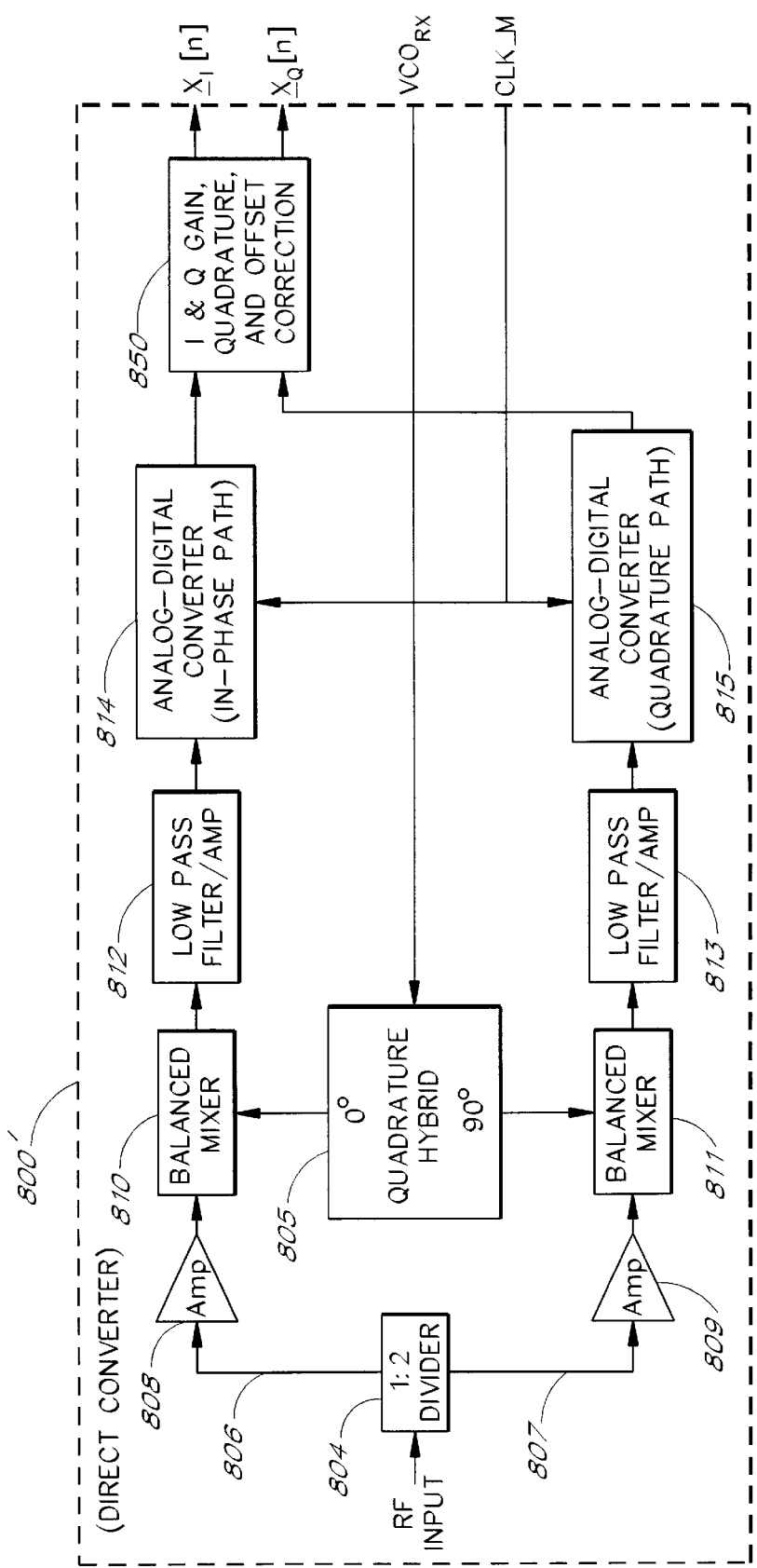
FIG. 12 illustrates another embodiment of a direct converter within the transceiver of FIGS. 5A and 5B.

FIG. 12 illustrates another embodiment of a direct converter 800' within the transceiver 200, 200' of FIGS. 5A or 5B. In FIG. 12, the direct converter 800' comprises a divider 804, a pair of amps 808, 809, a pair of balanced mixers 810, 811, a pair of low pass filter/amps 812, 813, a pair of analog-digital converters 814, 815, a quadrature hybrid module 805 and an I & Q gain, quadrature and offset correction module 850. In one embodiment, the direct converter 800' of FIG. 12 may include an input LNA coupled to the RF input of the divider 205.

In FIG. 12, the divider 804 receives an RF input from the LNA 216 (FIG. 5A). The divider 804 is coupled to both amps 808, 809. The amp 808 is coupled to the balanced mixer 810, which is coupled to the quadrature hybrid module 805 and the low pass filter/amp 812. The low pass filter/amp 812 is coupled to the analog-digital converter 814, which is coupled to the analog digital converter 815, the I & Q gain, quadrature and offset correction module 850 and the digital processor interface (FIG. 5A). The amp 809 is coupled to the balanced mixer 811, which is coupled to the quadrature hybrid module 805 and the low pass filter/amp 813. The low pass filter/amp 813 is coupled to the analog-digital converter 815, which is coupled to the analog digital converter 814, the I & Q gain, quadrature and offset correction module 850 and the digital processor interface (FIG. 5A).

Figure 13:
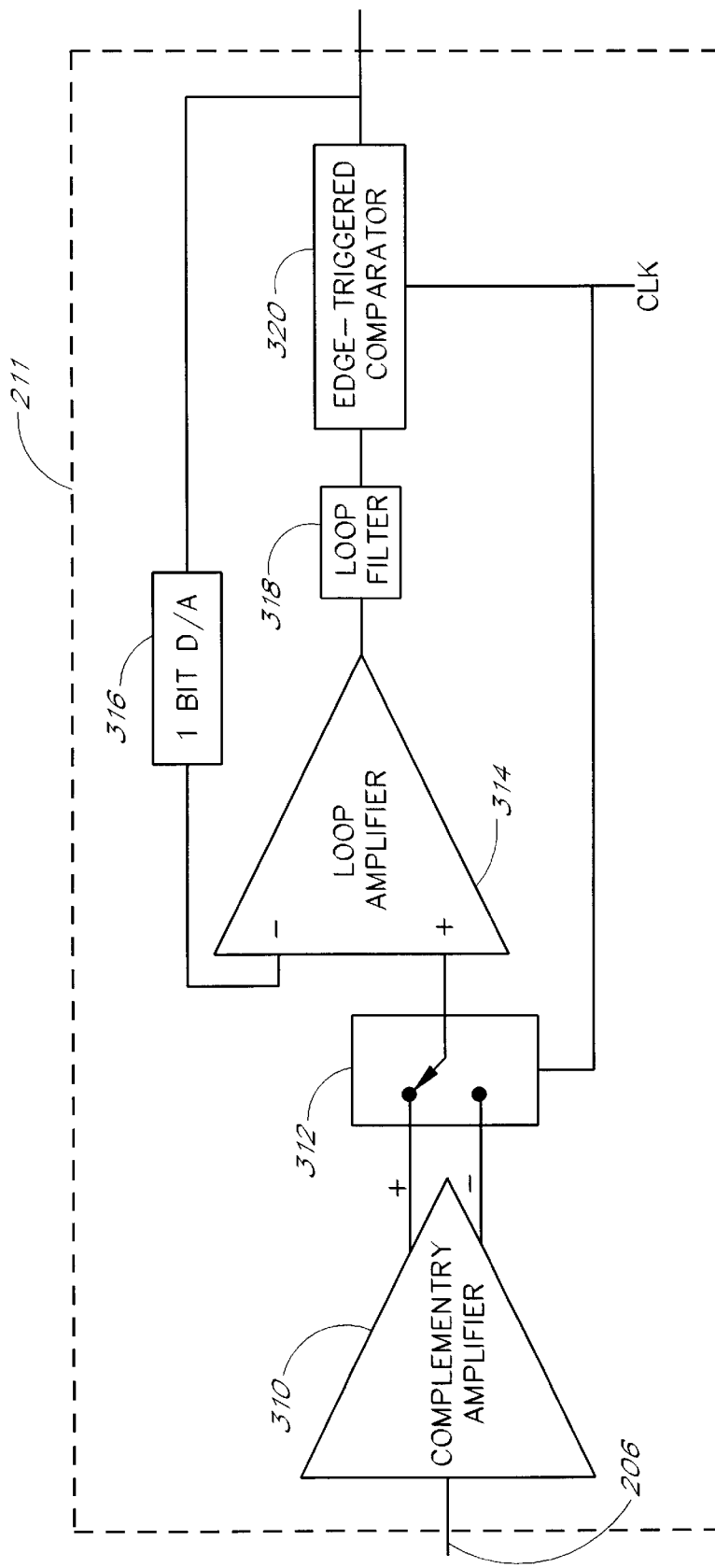
FIG. 13 illustrates one embodiment of a translating delta-sigma modulator within the direct converter of FIGS. 7 and 11.

FIG. 13 illustrates one embodiment of a translating delta-sigma modulator 211 within the direct converters 220, 220' of FIGS. 7 and 11. Because the modulator 213 is substantially similar to the modulator 211, only the modulator 211 will be described herein. In FIG. 13, the modulator 211, 213 comprises a complementary amplifier 310, a switch 312, a loop amplifier 314, a one-bit digital-to-analog converter 316, a loop filter 318 and an edge-triggered comparator 320.

In FIG. 13, the output 206 of the divider 205 (FIGS. 7 or 11) is input into the complementary amplifier 310, which is coupled to the switch 312. The switch 312 is coupled to the loop amplifier 314. The loop amplifier 314 is coupled to the digital-to-analog converter 316 and the loop filter 318, which is coupled to the comparator 320. The CLK signal is coupled to the switch 312 and the edge-triggered comparator 320.

The modulator 211 translates the received I & Q signal components by an amount equal to the frequency of the CLK signal, $f_{RX}$, to the baseband of the received signal and digitizes the I & Q signal components. In FIG. 13, the complementary amplifier 310 receives the modulated RF carrier signal. At a non-inverting output, the complementary amplifier 310 produces a voltage that is G times the voltage at the input to the complementary amplifier 310. At an inverting output, the complementary amplifier 310 produces a voltage that is −G times the voltage at the input to the complementary amplifier 310. The inverting and non-inverting outputs of the complementary amplifier 310 are coupled to two input ports of a switch 312. The control port of the switch 312 determines which input port of the switch 312 is coupled to the output port of the amplifier 310 and is driven by the conversion clock, CLK, such that the output port of the switch 312 is alternately coupled to the inverting and non-inverting outputs of the complementary amplifier 310.

Together, the complementary amplifier 310 and the switch 312 perform the functions of a commutator which inverts the polarity of the modulated RF carrier signal on every half cycle of the conversion clock, CLK. If the frequency of the conversion clock CLK is chosen to be approximately equal to the carrier frequency of the modulated RF carrier signal, effectively, the commutator translates the modulation of the carrier signal down to D.C. centered or frequency offset baseband. In addition to the low frequency signal components, high frequency signal components are also generated by the commutator. However, the high frequency components are attenuated by the delta-sigma modulator 211 and further filtering. In one embodiment, the frequency of the conversion clock CLK is programmable to permit the translation of a variety of waveforms over a range of center frequencies.

In one embodiment, the commutator comprised of the complementary amplifier 310 and the switch 312 is not a conventional downconverter. The mathematical paradigm for a conventional downconverter is multiplication by a sinusoidal signal. Practical implementations of conventional downconverters (such as circuits employing using diode rings or Gilbert multiplier circuits) are incapable of realizing this mathematical paradigm without introduction of distortion and feed-through effects that result in the creation of undesired spurious signals.

In contrast, the mathematical paradigm of the commutator is that of alternately multiplying the input signal by +1 and −1 on opposite half cycles of a clock signal. Practical implementations of the commutator employing a fast switch behave more closely to this mathematical paradigm, thus avoiding the production of non-linear components of the signal in the baseband signal in comparison to a conventional down converter.

The output of the switch 312 is coupled to the input of the core delta-sigma modulator, which comprises a loop amplifier 314, a loop filter 318, an edge-triggered comparator 320 and a one-bit digital-to-analog (D/A) converter 316. In the preferred embodiment, the core delta-sigma modulator is operated at the same frequency as the commutator. Use of a conversion clock operating at or near the carrier frequency provides a significant oversampling ratio in typical embodiments and, hence, leads to high resolution, high dynamic range performance according to well-known principles of delta-sigma conversion.

In FIG. 13, the output of the loop amplifier 314 is the difference between the voltage coupled to its non-inverting input port and its inverting input port times a voltage gain, $A_v$, where the voltage gain is typically a large positive constant. The loop filter 318 is typically an analog low pass filter but can be embodied in other forms. In one embodiment, the loop amplifier 314 and loop filter 318 act as an integrator. When the voltage value at the signal input to the edge-triggered comparator 320 is greater than a predetermined threshold value at the time the conversion clock transitions, the output is a logic value 1. When the voltage value at the signal input to the edge-triggered comparator 320 is less than the predetermined threshold value at the time the conversion clock transitions, the output is a logic value 0. The output of the edge-triggered comparator 320 is coupled to the input of the one-bit digital-to-analog converter 316. The one-bit digital-to-analog converter 316 produces one of two analog levels at its output depending upon the digital logic value applied to its input. The output of the one-bit digital-to-analog converter 316 is coupled to the inverting input of the loop amplifier 314.

The core delta-sigma modulator 211, 213 shown in FIG. 13 and described above is a standard, one-bit digital-sigma modulator. However, a variety of delta-sigma modulators and delta-sigma modulation techniques can be combined with the teachings of the present invention. For example, additional information concerning delta-sigma modulators is found in *Delta-Sigma Data Converters: Theory, Design, and Simulation* by Steven R. Norsworthy, published by IEEE Press in 1996.

Because metal-oxide semiconductor (MOS) technology lends itself inherently to implementing discrete-time filters based on capacitor ratios, prior art systems use switched-capacitor technology to implement delta-sigma modulators. Inherently, switched-capacitor filters cause aliasing and, hence, additional interference to the system. In addition, because MOS switched-capacitor circuits must be operated at a much lower oversampling ratio, they do not have as much resolution for any given order of the delta-sigma modulator, compared to one embodiment of the modulator 211 of the present invention. In order to gain resolution, prior art systems typically use higher order loop filters which are only conditionally stable. As the order of the delta-sigma modulator is increased, the implementation of a stable loop that is capable of operating at high clock frequencies becomes more difficult.

In contrast, one embodiment of the modulator 211 comprises a continuous-time filter for the loop filter 318. As noted above, one embodiment of the delta-sigma modulator 211 operates at or near the carrier frequency. Due to the use of a high frequency clock, the use of higher order filtering is not needed to achieve a high degree of resolution. Therefore, the use of a lower order, continuous-time filter is practical in conjunction with one embodiment of the modulators 211, 213. Continuous-time filters are less difficult and bulky to implement than switched-capacitor filters. Furthermore, continuous-time filters can be operated at much higher frequencies than switched-capacitor circuits in a given semiconductor technology. Finally, the use of a continuous-time filter has the added advantage of eliminating aliasing that is potentially produced by switched-capacitor filters.

Many modern delta-sigma converters are currently available that are implemented in silicon metal oxide semiconductor (MOS) technology. Typically such designs use switched capacitor techniques to sample the incoming signal for conversion. However, circuits capable of processing high frequency input signals, such as those formed from silicon bipolar, silicon germanium (SiGe), or gallium arsenide (GaAs) technologies, can use current steering architectures in order to increase system efficiencies.

Figure 14E:
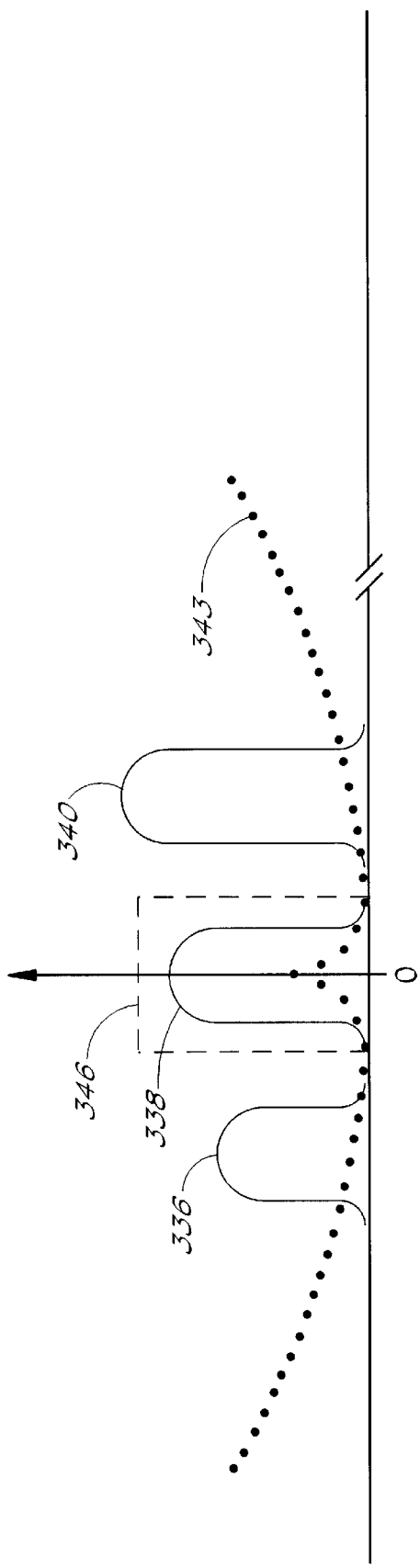

FIGS. 14A–14E are spectral plots used to illustrate the operation of various embodiments of the transceiver 200 of FIG. 1. An understanding of the desired characteristics of the decimation filter 300 can be understood with reference to FIG. 14A where the vertical axis represents energy such as in units of decibels and the horizontal axis represents frequency such as in units of Gigahertz. FIG. 14A is a spectral plot showing received signal energies 330, 332 and 334 centered about three different carrier frequencies, $f_{c1}$, $f_{c2}$ and $f_{c3}$, respectively. In one embodiment, we shall assume that signal energies 330, 332 and 334 each comprise an incoming waveform comprising a digitally modulated RF signal of interest. We shall also assume that the conversion clock, CLK, operates at a frequency $f_{RX}$ which is between frequencies $f_{c1}$ and $f_{c2}$, In FIG. 14A, the horizontal axis has been segmented so that more of the signal energy can be shown.

FIG. 14B represents the corresponding output of the switch 312 (excluding noise) of FIG. 13 when the spectrum shown in FIG. 14A is applied thereto. For example, in a typical embodiment, the frequency $f_{RX}$ is equal to 1851.4 MHz and the frequencies $f_{c1}$, $f_{c2}$ and $f_{c3}$ are 1851, 1851.6 and 1852.2 MHz, respectively. Each of the signal energies 330, 332 and 334 have a bandwidth of approximately 100 kHz. Thus, in FIG. 14B, the signal energies 336, 338 and 340 correspond to signal energies 330, 332 and 334, respectively, and are centered about −400 kHz, 200 kHz and 800 kHz, respectively. Note that the signal energy 336 has been translated to the negative portion of the frequency axis.

A dashed line 342 of FIG. 14C represents the transfer curve of the decimation filter 300 in one embodiment. In the embodiment of FIG. 14C, the low pass decimation filter 300 passes all three signal energies 336, 338 and 340. (For example, each of the signal energies 336, 338 and 340 could be produced by a different transmitting unit.) In this example, none of the signal energies are centered about D.C. Thus, the effects of any DC offset in the system and the 1/f noise (denoted by the increase in the spectral noise density curve 343 around zero frequency) can be reduced by follow-on filtering, for example, matched filtering. The spectral noise density curve 343 of FIG. 14C shows that the spectral noise density level increases (primarily due to quantization noise of the delta-sigma converter) as the frequency increases, except for 1/f increase near zero frequency. As a result, the noise level within the bandwidth of signal energy 340 is greater than that for signal energies 336 or 338. In one embodiment, the decimation filter 300 is implemented with low pass filtering and equivalent bandpass filtering is implemented in the following matched filter.

In an alternative embodiment, the decimation filter 300 is more frequency selective such that only one of the signal energies (such as might be produced by a single transmitting unit) is passed without substantial attenuation. For example, in FIG. 14D, the dashed line 344 shows such a decimation filter 300 transfer characteristic. As shown in FIG. 14D, in the alternative embodiment, only the signal energy 338 is efficiently passed through the decimation filter 300.

In yet another embodiment, the down-converted waveform is centered about the D.C., i.e., the waveform has zero frequency offset, as shown in FIG. 14E. Conversion to D.C. centered baseband has the benefit of achieving higher resolution for a given clock rate which can be a particular benefit for wide band signals where the effects of quantization noise should be minimized. The effects of 1/f noise are less pronounced in a wide band system and can be filtered with a notch filter at zero frequency without significantly degrading the performance. A dashed line 346 of FIG. 14E represents the transfer curve of the decimation filter 300 in one such embodiment. More information concerning the design of decimation filters can be found in *Multi-Rate Digital Signal Processing*, Prentice-Hall Inc., Englewood Cliffs, N.J., 1983 by R. E. Crochiere and L. R. Rabiner.

It is advantageous for the receiver 106 (FIG. 1) to operate in accordance with more than one communication protocol. For example, the receiver can operate in a narrow band time division multiple access (TDMA) system such as Global System for Mobile Communications (GSM) or a wide band code division multiple access (CDMA) system such as defined in the Telephone Industry Association, Electronic Industry Association (TIA/EIA) interim standard entitled "Mobile Station—Base Station Capability Standard for Dual-Mode Wide band Spread Spectrum Cellular System," TIA/EIA/IS-95.

During TDMA operation, the decimation filter 300 can take on a narrow band transfer characteristic, shown by dashed line 344. Alternatively, during CDMA operation, the offset and bandwidth of this filter, shown by line 342, may be increased according to well known principles of digital filtering and signal reception. Alternatively, a single wide band, low-pass decimation filter could be utilized and the programmable bandwidth implemented in the following matched filtering.

I&Q Gain Quadrature And Offset Correction

Figure 15:
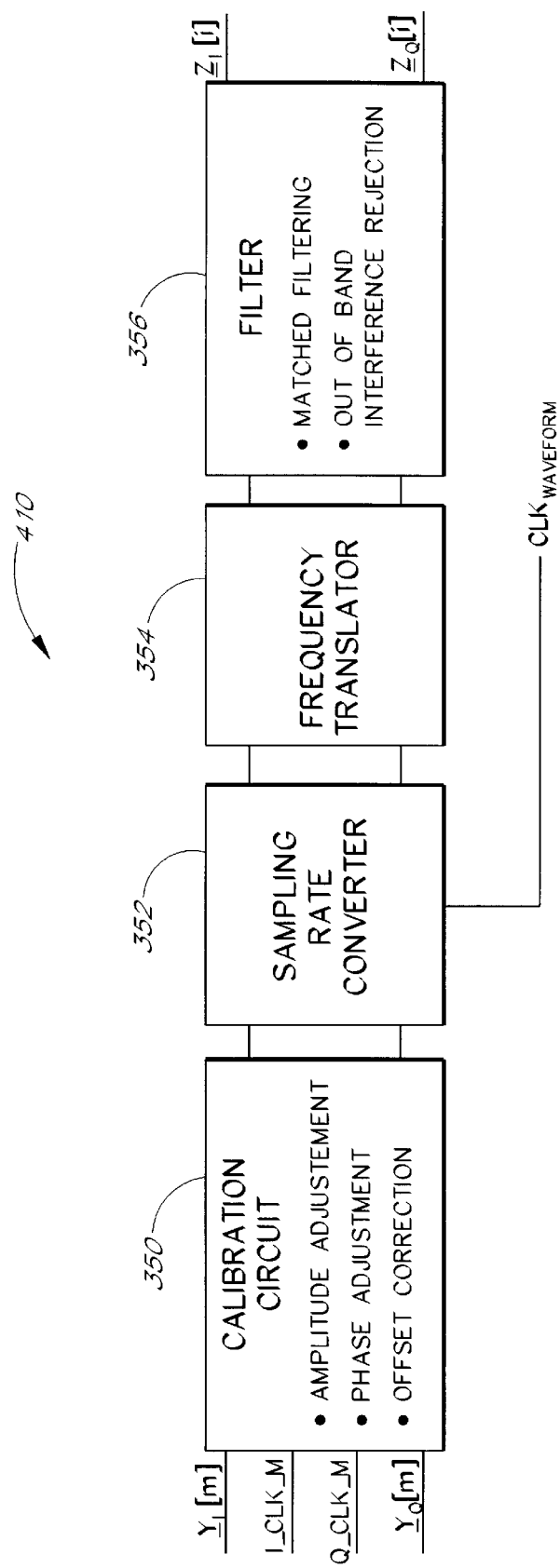
FIG. 15 is a block diagram showing one embodiment of a component within FIGS. 11 and 12.

In FIG. 11, the output of the decimation filter 300 is the input into the I&Q gain quadrature and offset correction component 410. FIG. 15 is a block diagram showing one embodiment of the component 410. In FIG. 15, the clock and data output of the decimation filters 300 are coupled to a calibration circuit 350. The calibration circuit 350 adjusts the relative gain and phase so that the in-phase and quadrature signal paths are balanced with respect to each other. In order to avoid introduction of distortion into the signals, it is important that the relative gain and phase of the in-phase and quadrature signal paths are the same.

One advantage of a digital signal processing architecture shown in FIG. 15 is that the parameters can be controlled in the digital circuit elements more easily than in analog circuit elements. Typically, unbalances originate from the differences in gain between the I and Q channels and errors in the relative 90° phase shift between the I and Q channels. Additionally, any differences in the DC offsets can be calibrated out. Additional information concerning accomplishment of calibration can be found in U.S. Pat. No. 5,422,889 entitled "OFFSET CORRECTION CIRCUIT," and in U.S. Pat. No. 5,604,929 entitled "SYSTEM FOR CORRECTING QUADRATURE GAIN IN-PHASE ERROR IN A DIRECT CONVERSION SINGLE-SIDE BAND RECEIVER INDEPENDENT OF THE CHARACTERISTICS OF THE MODULATED SIGNAL."

In FIG. 15, the output of the calibration circuit 350 is coupled to the input of a sampling rate converter 352. The sampling rate converter 352 converts and synchronizes the data rate of the signal to the rate of an external clock, $CLK_{waveform}$. In one embodiment, this function is accomplished with a linear or higher order interpolation method such as the one described in "Advanced Digital Signal Processing" by J. G. Proakis, et al., and McMillian Publishing Co.

In FIG. 15, the output of the sampling rate converter 352 is coupled to the input of a frequency translator 354. In one embodiment, the frequency translator 354 is used to translate the center frequency of the signal of interest to a D.C. centered baseband. The frequency translator 354 multiplies the signal at the output of the sampling rate converter 352 with a digital representation of a sinusoidal signal having a frequency equal to the center of the frequency of signal of interest. The advantage of frequency translation is that it allows the matched filter 356 for the signal to be implemented as a low pass filter and provides the baseband I and Q inputs required for the digital demodulator input. For the situation shown in FIG. 14E where there is only one signal of interest and it has zero offset, the frequency translator 354 is preferably not used.

When the frequency translator 354 is utilized, and the output of the matched or channel filter 250 is utilized as an input to the cross correlation measurement module 240 as shown in FIG. 5A, then the input Z(n) to the cross correlation measurement module 240 must also undergo the same frequency translation. The translation can be accomplished by including a frequency translator in the cross correlation measurement module 240.

In FIG. 15, the output of the frequency translator 354 is coupled to a low pass filter 356 which can operate as a signal matched filter. The low pass filter 356 is also used to reject interference outside the bandwidth of interest. The output of the low pass filter 356 provides a digital I and Q signal input to the digital demodulator that is synchronized with the digital demodulator clock—$CLK_{Waveform}$.

Clock Generator

Figure 16:
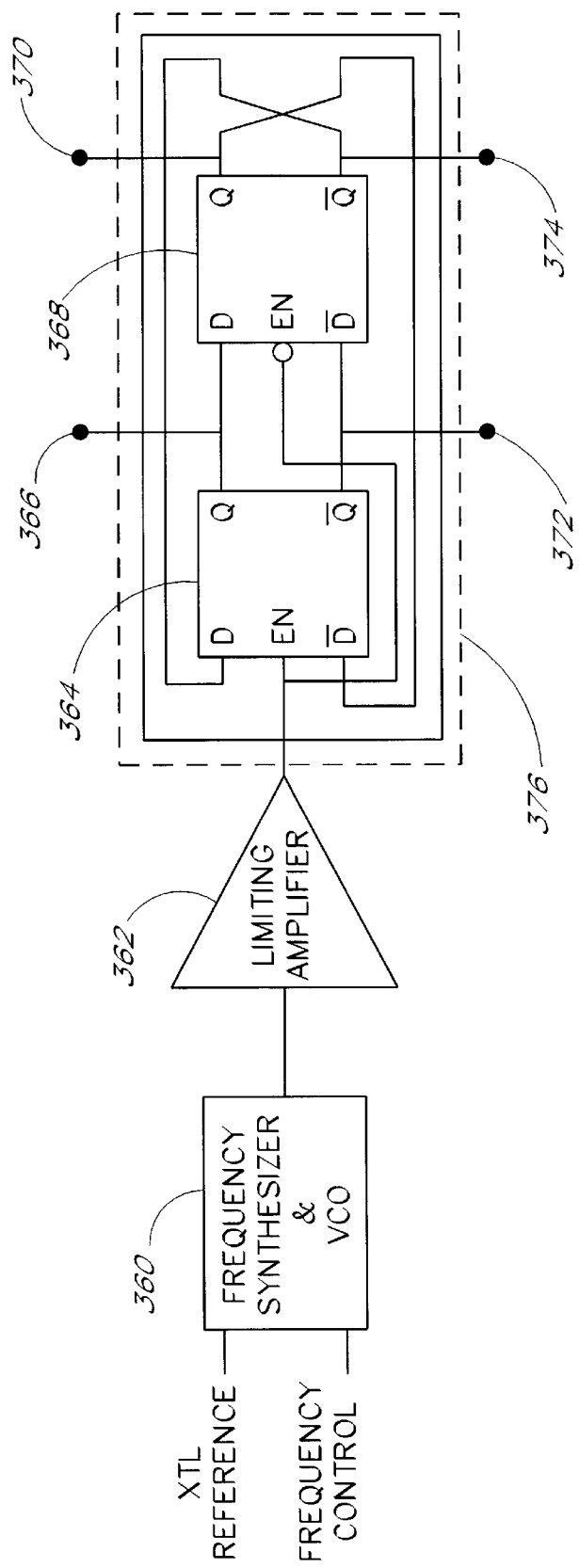
FIG. 16 is a block diagram showing one embodiment of a clock generator of FIG. 7.

FIG. 16 is a block diagram showing one embodiment of the clock generator 500 of FIG. 7. In FIG. 16, a frequency synthesizer 360 produces an analog waveform at twice the rate of the conversion clock, CLK. The output of the frequency synthesizer 360 is coupled to the input of a limiting amplifier 362. In this embodiment, the positive going zero crossing of the signal output by the frequency synthesizer 360 is compared to a threshold by the limiting amplifier 362. When the threshold is chosen appropriately, the limiting amplifier 362 produces a waveform with digital logic values at the same frequency as that of the output from the frequency synthesizer 360 and having a 50% duty cycle (i.e., the duration of the logic "1" pulse is the same as the duration of the logic "0" pulse).

In FIG. 16, the limiting amplifier 362 drives a master slave flip-flop 376 comprising a master latch 364 and a slave latch 368. The master-slave flip-flop 376 is configured in a divide-by-two configuration. In this configuration, a Q output 366 and a $\overline{Q}$ output 372 of the flip-flop 364 are connected to the D and $\overline{D}$ inputs of the flip-flop 368, respectively, and a Q output 370 and a $\overline{Q}$ output 374 of the flip-flop 368 are connected to the $\overline{D}$ and D inputs of the flip-flop 364, respectively. When the master-slave flip-flop is connected in this manner, the four latch outputs 366, 372, 370 and 374, have clock phases of 0°, 90°, 380°, and 270°, with respect to one another. Two of these outputs (for example, output 366 and output 370) can be used as I_CLK and Q_CLK, respectively. Although the implementation of FIG. 16 is included explicitly herein for illustration purposes, a variety of other means (such as a ring oscillator) can be used to generate a clock signal in accordance with the present invention.

Another Embodiment of the Modulator

Figure 17:
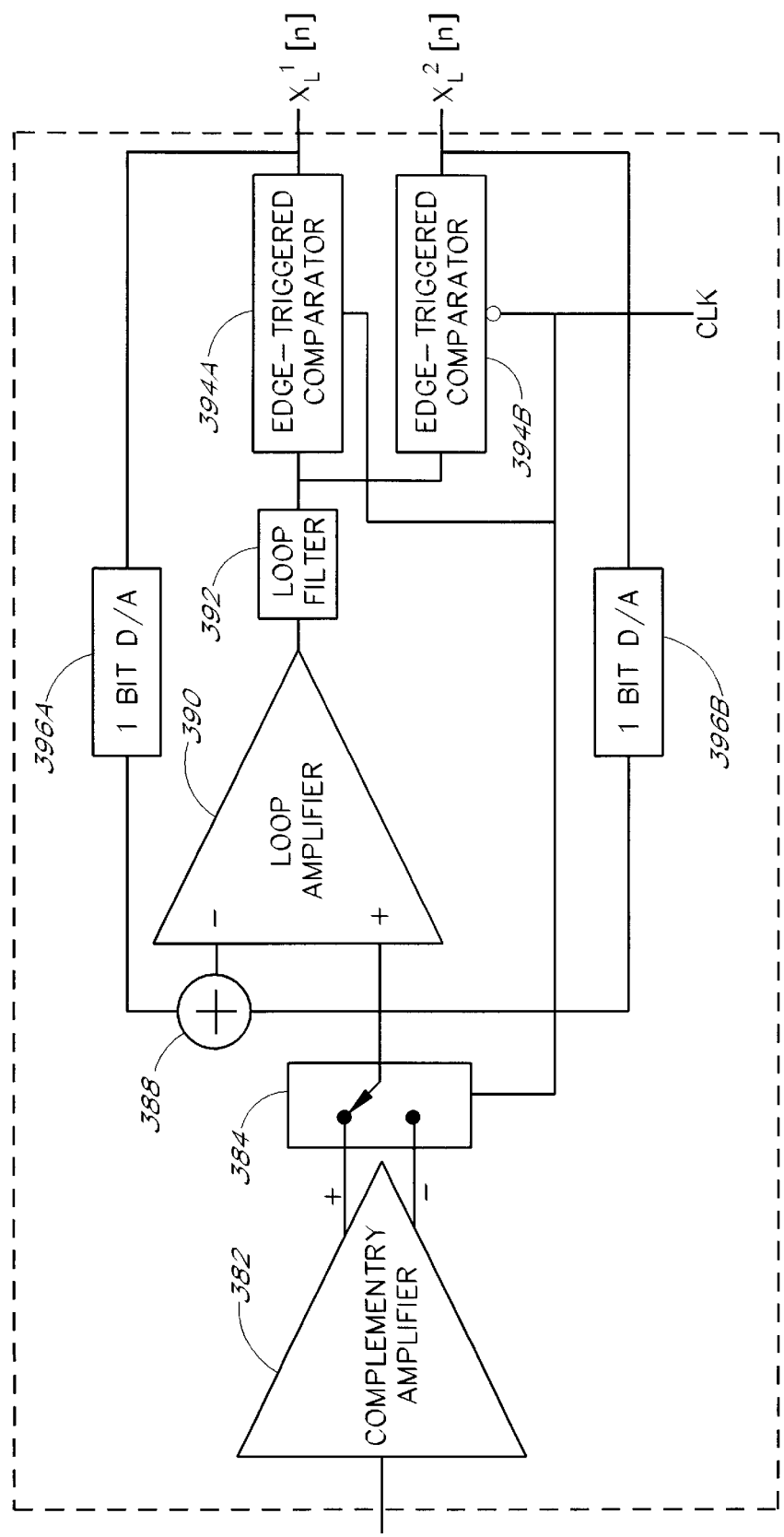
FIG. 17 illustrates another embodiment of a modulator within the direct converters of FIGS. 7 and 11.

FIG. 17 illustrates another embodiment of a translating delta-sigma modulator 380 which employs double-sampling (i.e., samples on both edges of a clock signal). The delta-sigma modulator 380 of FIG. 17 operates under some of the same principles as the single sampled architecture shown in FIG. 13 while doubling the sample rate, thereby relaxing the speed requirements for circuitry by a factor of two. The delta-sigma modulator 380 can be used as within the architecture shown in FIG. 7 as the transmitting delta-sigma modulators 211 and 213.

In FIG. 17, complementary amplifier 382 receives the digitally modulated RF signal centered about the carrier frequency. At a non-inverting output, the complementary amplifier 382 produces a voltage that is G times the voltage at the input to the complementary amplifier 382. At an inverting output, the complementary amplifier 382 produces a voltage that is −G times the voltage at the input to the complementary amplifier 382. The inverting and non-inverting outputs of the complementary amplifier 382 are coupled to two input ports of a switch 384. The control port of the switch 384 determines which input port is coupled to the output port and is driven by the conversion clock, CLK, such that the output port of the switch 384 is alternately coupled to the inverting and non-inverting outputs of the complementary amplifier 382.

Together, the complementary amplifier 382 and the switch 384 perform the functions of a commutator as explained more fully above with reference to FIG. 13. The output of the switch 384 is coupled to the input of the core double-sampling delta-sigma modulator. The core double-sampling delta-sigma modulator is comprised of a combiner 388, a loop amplifier 390, a loop filter 392, an even-phase edge-triggered comparator 394A, an odd-phase edge-triggered comparator 394B, an even-phase digital-to-analog converter 396A and an odd-phase digital-to-analog converter 396B.

The output of the switch 384 is coupled to the non-inverting input of the loop amplifier 390. The output of the loop amplifier 390 is the difference between the voltage coupled to its non-inverting input port and its inverting input port times a voltage gain $A_v$, where the voltage gain is typically a large positive constant. The output of the loop amplifier 390 is coupled to the input of the loop filter 392. In a preferred embodiment, the loop filter 392 is an analog low pass filter but can be embodied in other forms. In one embodiment, the loop amplifier 390 and loop filter 392 act as an integrator.

The output of the loop filter 392 is coupled to the input of the even-phase edge-triggered comparator 394A and also to the input of the odd-phase phase edge-triggered comparator 394B. The clock inputs of the even-phase edge-triggered comparator 394A and the odd-phase edge-triggered comparator 394B are coupled to the conversion clock, CLK. The even-phase edge-triggered comparator 394A and odd-phase edge-triggered comparator 394B are clocked using opposite edges of the comparison clock, CLK. For example, in one embodiment, the even-phase edge-triggered comparator 394A performs a comparison on the rising edge of the comparison clock, CLK, and the odd-phase edge-triggered comparator 394B performs a comparison on the falling edge of the comparison clock, CLK.

The logic values output by the even-phase edge-triggered comparator 394A and the odd-phase edge-triggered comparator 394B are coupled to the input of the digital-to-analog converter 396A and the digital-to-analog converter 396B, respectively. The outputs of the digital-to-analog converter 396A and digital-to-analog converter 396B are combined through the combiner 388 and drive the inverting input of the loop amplifier 390. In one embodiment, the combiner 388 simply adds the two values together. In another embodiment, the combiner 388 time-division multiplexes the values into the loop. One useful attribute of the first embodiment of the combiner 388 is that linearity can be achieved without tight matching between the digital-to-analog converter 396A and the digital-to-analog converter 396B since their respective outputs are effectively averaged before being presented to the loop amplifier.

In one embodiment, the outputs of edge-triggered comparator 394A and edge-triggered comparator 394B are also coupled to the decimation filter 300 in a similar manner to the single-sampled case. In such an embodiment, typically the architecture of the decimation filter 300 is appropriately modified to accommodate processing the samples in the form of two bit serial words instead of a single high speed serial bit stream.

Due to the continuous time nature of the direct converter embodiments shown in FIGS. 7, 13 and 17, the direct converter embodiments are not limited in dynamic range in contrast to conventional multistage down converters. Thus, there is no need to incorporate automatic gain control into the front end of the receiver. For example, in FIG. 5A, the amplitude of the incoming waveform applied to the receiver direct converter 220 is in fixed proportion of an amplitude of a signal received by the receive antenna radiator 102 because no automatic gain control mechanism is included. As noted above, automatic gain control used to extend the dynamic range of a receiver may be undesirable for spectrally crowded applications such as cellular communications because the automatic gain control may make the receiver sensitivity dependent upon signals and interference that are outside the signal channel. For example, it is possible for a strong signal in an adjacent channel to capture the receiver front end and desensitize the receiver such that a weak signal in the channel of interest is undetectable. This is particularly harmful in a base station receiver where the receiver receives incoming signals from multiple remote units. Furthermore, the use of automatic gain control will likely require the digital coherent canceller to track the gain changes which will introduce errors and noise.

The digital decimation filtering of the receiver direct converter 220 (FIGS. 5A, 7 and 8), the reference direct converter 238 (FIG. 5A), and the matched or channel filter 250 (FIG. 5A) with low side lobes may significantly suppress the transmit signal outside of the desired signal bandwidth. In a preferred implementation, these digital decimation filters 220, 238, 250 have approximately 90 dB attenuation. This attenuation advantageously reduces the amount of filtering provided by the duplexer receiver filter 214.

In one embodiment, the reference direct converter 238 and/or the receiver direct converter 220 have a sampling rate approximately equal to that of the carrier frequency of interest. This may significantly reduce the requirements on the duplexer receive filter 214 and the reference bandpass filter 236 to provide attenuation at the aliasing frequency (i.e., at half the RF frequency).

The invention may be embodied in other specific forms without departing from its spirit or essential characteristics. The described embodiment is to be considered in all respects only as illustrative and not restrictive and the scope of the invention is, therefore, indicated by the appended claims rather than the foregoing description. All changes which come within the meaning and range of equivalency of the claims are to be embraced within their scope.

What is claimed:

1. An adaptive coherent digital canceller system configured to attenuate a transmitter leakage signal spectrum that leaks into a bandwidth of a receiver, the canceller system comprising:

a reference filter filtering a transmit signal from a transmitter, the reference filter having a transfer function substantially similar to a receiver filter adapted to filter a received signal;

a reference direct converter receiving a filtered signal from the reference filter, the reference direct converter adapted to output a digitized transmit signal reference of a spectral energy of the transmitter within the bandwidth of the receiver, the digitized transmit signal having a phase and an amplitude;

a cross correlation measurer receiving an output signal from the reference direct converter, the cross correlation measurer cross-correlating a first signal from a receiver path with a second signal from the reference direct converter, the cross correlation measurer identifying common signal characteristics of the first and second signals;

an adaptation coherent spectral canceller module receiving parameters from the cross correlation measurer;

an adaptive digital transversal filter receiving an output signal from the reference direct converter and receiving coefficients from the canceller module, the transversal filter aligning the amplitude and phase of the output signal from the reference direct converter with the transmitter leakage signal spectrum in the receiver path, the adaptive digital transversal filter outputting a compensated digitized transmit signal reference; and a combiner adapted to coherently subtract the compensated digitized transmit signal reference from the receiver signal with the transmitter leakage signal spectrum to form a residue whose transmitter spectral signal power within the bandwidth of the receiver is suppressed.

2. The canceller system of claim 1, wherein the reference direct converter comprises a high dynamic range, direct converter.

3. The canceller system of claim 1, further comprising a receiver, high dynamic range direct converter filtering the receiver signal with the transmitter leakage signal spectrum.

4. The canceller system of claim 1, wherein the reference filter has a bandpass transfer function that is substantially similar to a bandpass transfer function of a receiver bandpass filter.

5. The canceller system of claim 1, wherein the combiner uses a digital delay to compensate for any difference in time delays between the compensated digitized transmit signal reference from the transversal filter and the receiver path, said digital delay reducing time de-correlation effects and instabilities due to different path lengths and processing times between the receiver and reference paths.

* * * * *